(12) United States Patent
Polany et al.

(10) Patent No.: US 7,535,799 B2
(45) Date of Patent: May 19, 2009

(54) PROTECTIVE HOUSING FOR AN AUDIO DEVICE

(75) Inventors: Rany Polany, San Diego, CA (US); Carl Wilhelm Pettersen, San Diego, CA (US); Kari Kristian Rauhala, Del Mar, CA (US); Stephanie Ann Griffin, Encinitas, CA (US); Jim Abelardo Pena, Encinitas, CA (US); Tsui Wai Man Victor, Hong Kong (CN); Zhang Zhong Shuang, Guang Dong Province (CN)

(73) Assignee: H2O Audio, Inc., San Diego, CA (US)

( * ) Notice: Subject to any disclaimer, the term of this patent is extended or adjusted under 35 U.S.C. 154(b) by 264 days.

(21) Appl. No.: 11/518,335

(22) Filed: Sep. 8, 2006

(65) Prior Publication Data

US 2007/0086273 A1  Apr. 19, 2007

Related U.S. Application Data

(63) Continuation-in-part of application No. 11/123,878, filed on May 6, 2005, which is a continuation-in-part of application No. 10/959,894, filed on Oct. 6, 2004, now Pat. No. 7,263,032, which is a continuation-in-part of application No. 10/629,315, filed on Jul. 28, 2003, now Pat. No. 6,954,405, which is a continuation of application No. 09/930,037, filed on Aug. 14, 2001, now Pat. No. 6,614,722, which is a continuation-in-part of application No. 09/411,983, filed on Oct. 4, 1999, now Pat. No. 6,396,769.

(60) Provisional application No. 60/715,525, filed on Sep. 9, 2005.

(51) Int. Cl.
  *B65D 85/00* (2006.01)
(52) U.S. Cl. ..................................................... 367/131

(58) Field of Classification Search ................. 367/131, 367/141, 165, 173; 381/189, 334, 335, 379, 381/381, 386; 361/679; 200/331; 206/320
See application file for complete search history.

(56) References Cited

U.S. PATENT DOCUMENTS 4,281,343 A  7/1981  Monteiro (Continued)

FOREIGN PATENT DOCUMENTS

GB  2290696 A  1/1996

(Continued)

OTHER PUBLICATIONS

Gray Ghost Underwater Headphones, www.detectorpro.com/grayghost-underwater.htm, Apr. 2004.

(Continued)

*Primary Examiner*—Dan Pihulic
(74) *Attorney, Agent, or Firm*—Knobbe Martens Olson & Bear LLP

(57) ABSTRACT

Disclosed herein are systems for housing an electronic audio device in harsh environments including aquatic and rugged environments. In one embodiment, a system is disclosed for allowing a user to control an audio device having a capacitive touch sensitive control feature from outside of a waterproof housing.

37 Claims, 33 Drawing Sheets

U.S. PATENT DOCUMENTS

| | | | |
|---|---|---|---|
| 4,336,537 A | 6/1982 | Strickland | |
| 4,381,144 A | 4/1983 | Breslau | |
| 4,456,797 A | 6/1984 | Olsen | |
| 4,465,189 A | 8/1984 | Molzan | |
| D278,761 S | 5/1985 | Fuller | |
| 4,562,590 A | 12/1985 | DeLage | |
| 4,584,718 A | 4/1986 | Fuller | |
| 4,646,872 A | 3/1987 | Kamon et al. | |
| 4,682,363 A | 7/1987 | Goldfarb et al. | |
| 4,683,587 A | 7/1987 | Silverman | |
| 4,727,599 A | 2/1988 | Rappaport | |
| 4,771,299 A | 9/1988 | Gell, Jr. | |
| 4,949,806 A | 8/1990 | Hofer | |
| 5,087,934 A | 2/1992 | Johnson | |
| 5,136,555 A | 8/1992 | Gardos | |
| 5,239,323 A | 8/1993 | Johnson | |
| 5,258,592 A | 11/1993 | Nishikawa et al. | |
| 5,285,894 A | 2/1994 | Kamata et al. | |
| 5,294,988 A | 3/1994 | Wakabayashi | |
| 5,325,139 A | 6/1994 | Matsumoto | |
| 5,337,364 A | 8/1994 | Fitch | |
| 5,386,084 A | 1/1995 | Risko | |
| 5,456,377 A | 10/1995 | Williams, Jr. | |
| 5,533,637 A | 7/1996 | Williams, Jr. | |
| 5,533,737 A | 7/1996 | Borowski | |
| 5,537,667 A | 7/1996 | Kenning | |
| 5,570,688 A | 11/1996 | Cochran et al. | |
| 5,579,284 A | 11/1996 | May | |
| 5,586,176 A | 12/1996 | Peck | |
| 5,600,730 A | 2/1997 | Kenning et al. | |
| 5,610,655 A | 3/1997 | Wakabayashi et al. | |
| 5,706,251 A | 1/1998 | May | |
| 5,790,683 A | 8/1998 | Salzani | |
| 5,822,180 A | 10/1998 | Deschamps | |
| 5,825,718 A | 10/1998 | Ueki et al. | |
| 5,889,730 A | 3/1999 | May | |
| 6,396,769 B1 * | 5/2002 | Polany | 367/131 |
| 6,614,722 B2 * | 9/2003 | Polany et al. | 367/131 |
| 6,646,864 B2 | 11/2003 | Richardson | |
| 6,681,022 B1 | 1/2004 | Puthuff et al. | |
| 6,785,566 B1 | 8/2004 | Irizarry | |
| 6,931,339 B1 | 8/2005 | Olstad et al. | |
| 6,954,405 B2 * | 10/2005 | Polany et al. | 367/131 |
| 7,263,032 B2 * | 8/2007 | Polany et al. | 367/131 |
| D550,210 S * | 9/2007 | Polany et al. | D14/217 |
| 2002/0098874 A1 | 7/2002 | Zirul et al. | |
| 2002/0122353 A1 * | 9/2002 | Polany et al. | 367/131 |
| 2002/0197064 A1 | 12/2002 | Bijsmans et al. | |
| 2003/0045235 A1 | 3/2003 | Mooney et al. | |
| 2004/0112143 A1 | 6/2004 | Richardson | |
| 2004/0120219 A1 * | 6/2004 | Polany et al. | 367/131 |
| 2005/0030707 A1 | 2/2005 | Richardson et al. | |
| 2005/0123161 A1 * | 6/2005 | Polany et al. | 367/141 |
| 2005/0174727 A1 * | 8/2005 | Thomas et al. | 361/681 |
| 2005/0254778 A1 * | 11/2005 | Pettersen et al. | 386/46 |
| 2007/0080446 A1 * | 4/2007 | Maloney | 257/704 |
| 2007/0086273 A1 * | 4/2007 | Polany et al. | 367/131 |
| 2007/0139873 A1 * | 6/2007 | Thomas et al. | 361/681 |
| 2007/0261978 A1 * | 11/2007 | Sanderson | 206/320 |
| 2007/0280053 A1 * | 12/2007 | Polany et al. | 367/131 |
| 2008/0017493 A1 * | 1/2008 | Richardson et al. | 200/331 |

FOREIGN PATENT DOCUMENTS

| | | | |
|---|---|---|---|
| JP | 359144297 A | 8/1984 | |
| JP | 07298383 A | 11/1995 | |

OTHER PUBLICATIONS

International Search Report and Written Opinion for PCT/US2005/015874 dated Aug. 22, 2005.

* cited by examiner

PROTECTIVE HOUSING FOR AN AUDIO DEVICE

RELATED APPLICATIONS

This application is a continuation-in-part of U.S. application Ser. No. 11/123,878, filed May 6, 2005, which is a continuation-in-part of U.S. application Ser. No. 10/959,894, filed Oct. 6, 2004, now U.S. Pat. No. 7,263,032, which is a continuation-in-part of U.S. application Ser. No. 10/629,315, filed Jul. 28, 2003, now U.S. Pat. No. 6,954,405, which is a continuation of U.S. application Ser. No. 09/930,037, filed Aug. 14, 2001, now U.S. Pat. No. 6,614,722, which is a continuation-in-part of U.S. application Ser. No. 09/411,983 filed Oct. 4, 1999, now U.S. Pat. No. 6,396,769, all of which are incorporated herein by reference in their entirety. This application also claims the benefit of U.S. Provisional Application No. 60/715,525, filed Sep. 9, 2005, which is incorporated herein by reference in its entirety.

BACKGROUND OF THE INVENTION

1. Field of the Invention

This invention relates in general to protective housings for audio devices.

2. Description of the Related Art

Watersports have increased in popularity as a recreational hobby over the decades. Currently, there is no reliable technology that will allow for the use of a personal and portable audio device, such as a music system, both while underwater or when exposed to water while above water. The emergence of lightweight and diminutive portable audio players such as compact disc, minidisk, and MP3 players have made feasible the enjoyment of music while engaging in physical exercise, sporting events and other outdoor activities. Such audio playing devices are not constructed to be submersed into an aquatic environment. Furthermore, there is a need for housings that provide water resistant and/or shock resistant protection for audio devices.

SUMMARY OF THE INVENTION

One embodiment disclosed herein includes a protective housing configured to receive an electronic audio device, comprising a movable control positioned on the exterior of the housing and a touch sensitive surface actuating member positioned in the interior of the housing and coupled to the movable control in such a way that movement of the movable control moves the touch sensitive surface actuating member laterally over a touch sensitive surface on the electronic audio device.

Another embodiment disclosed herein includes a protective housing adapted to receive an electronic audio device, comprising a conductive control feature disposed on the exterior of the housing and adapted to conduct charge from the exterior of the housing into proximity of a capacitive sensitive surface on the electronic audio device.

Another embodiment disclosed herein includes a protective housing adapted to receive an electronic audio device, comprising means for making electrical contact with a human finger on the exterior of the electronic audio device and means for conveying an electrical signal from the human finger into proximity of a capacitive sensitive surface on the electronic audio device.

Another embodiment disclosed herein includes an audio system, comprising an electronic audio device comprising a touch sensitive surface, a protective housing configured to receive the audio device, a movable control positioned on the exterior of the housing, and a touch sensitive surface actuating member positioned in close proximity to the touch sensitive surface, wherein the touch sensitive surface actuating member is coupled to the movable control in such a way that movement of the movable control moves the touch sensitive surface actuating member laterally over the touch sensitive surface.

Another embodiment disclosed herein includes a method of controlling an electronic audio device, the electronic audio device having a capacitive sensitive surface, the method comprising placing the electronic audio device in a housing and contacting an electrically conductive control feature on the exterior of the housing with a human finger such that an electrical signal from the human finger is conveyed into proximity of the electronic audio device.

BRIEF DESCRIPTION OF THE DRAWINGS

The features and advantages of the present invention, and a manner of attaining them, will become more apparent by reference to the following descriptions of one embodiment of the invention. The following drawings represent one means of attaining the invention disclosed herein, and should in no way be construed as limiting the scope of the invention claimed.

DETAILED DESCRIPTION OF THE PREFERRED EMBODIMENT

Figure 1:
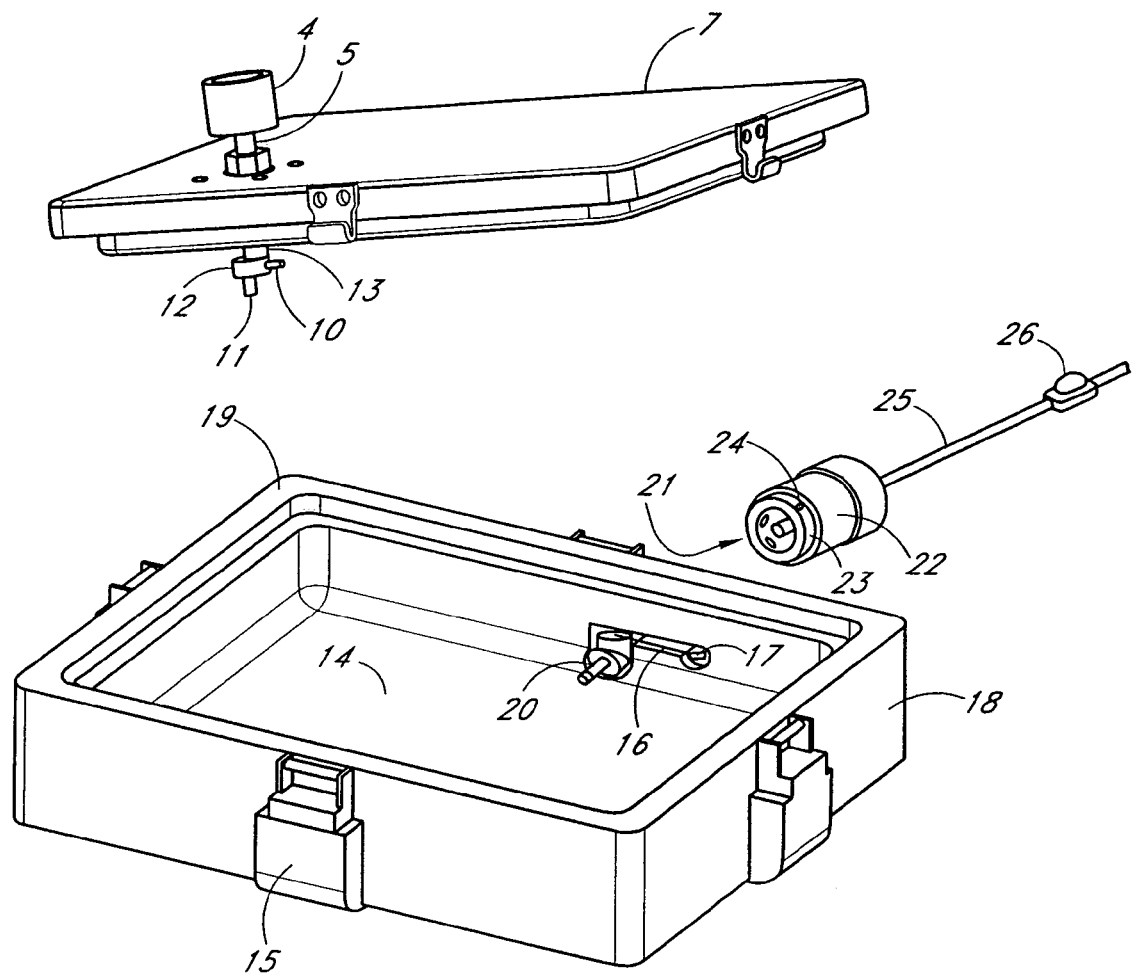
FIG. 1. An isometric view of the housing system and audio coupling unit.

Some embodiments of the invention disclosed herein relate to a system for generating personal audio signals in an aquatic environment. In some embodiments, the system includes waterproof earphones for generating audio signals to a user's ear while the ear is underwater. In some embodiments, the system includes methods for waterproofing an audio device that generates signals that are convertible to audio signals. Current technology does not allow for the reliable submersion of audio devices into aquatic environments or for the use of such audio devices in environments where they will be exposed to water. Furthermore, there exists only limited technology for the transmission of audio waves to a user submerged in such an aquatic environment.

Underwater submersion of earphones and audio devices require consideration of the effects of water and pressure on sensitive electronic components. In addition to the mechanical effects of pressure underwater, water pressure also promotes seepage of water into sensitive areas. Thus, in some embodiments, the devices disclosed herein are adapted to resist pressures encountered under water. In some embodiments, the devices are waterproof and pressure resistant to depths of up to 3 feet. In other embodiments, the devices are waterproof and pressure resistant to depths of up to 10 feet. In other embodiments, the devices are waterproof and pressure resistant to depths of up to 20 feet. In other embodiments, the devices are waterproof and pressure resistant to depths of up to 50 feet. In other embodiments, the devices are waterproof and pressure resistant to depths of up to 100 feet. In other embodiments, the devices are waterproof and pressure resistant to depths of up to 300 feet. In some embodiments, the devices are adapted to withstand the pressure experienced by a SCUBA diver.

As used herein, "waterproof" means that the device referred to as "waterproof" is capable of being completely submerged under water for a substantial period of time without water penetrating a "waterproof" barrier. The substantial period of time may include 30 seconds, 1 minute, 1 hour, or greater than 1 hour.

As used herein "aquatic environment" refers to an environment that is at least partially exposed to water. The exposure to water may come from being submerged or partially submerged in water or may come from exposure to droplets or streams of water, such as caused by splashing.

As used herein "aquatic activity" or "watersports" refers to any activity in which the participant is exposed to an aquatic environment as defined above.

In other embodiments, housings are provided that are not waterproof but are water resistant, providing protection for an audio device when used in applications where contact with water is incidental (e.g., snow related activities and exposure to rain). In still other embodiments, housings are provided that are not waterproof but are shock resistant, allowing the audio device to be used in rugged environments and activities.

The advent of miniaturized electronic devices such as audio players and communication equipment has made feasible the individual use of such devices during recreational and educational activities. Herein is disclosed a system for using a personal portable audio device while being submerged into an aquatic environment. Although some embodiments of the systems described herein may be waterproof under submersible conditions, such waterproof systems may also find application in activities where contact with water is incidental. Non-limiting examples include boating, jet skiing, winter sports such as downhill and cross-country skiing, snowboarding, and sledding, and activities where the user will encounter mud such as off-road motorcycling or ATV use.

In one embodiment, a rigid container capable of withstanding the pressure encountered while submerged into an aquatic environment is provided. Such a container can be made from any material capable of withstanding pressure, including but not limited to metal, ceramics, glass, rubber or plastic compositions.

One embodiment includes providing the rigid container with a removable lid, for easy removal or service of the device contained within. In one embodiment, at least one waterproof seal is positioned between the lid and container to prevent entry of water into the closed container. One skilled in the art is aware of multiple ways of providing a waterproof seal between a lid and a container. Without intent to limit the scope of the invention disclosed herein, such seals may consist of one or more of the following: an o-ring, rubber lining, or a silicon-based gel. In a preferred embodiment, at least one o-ring seal is positioned within a recessed grove along the perimeter of the lid's underside. In a more preferred embodiment, the lid is provided with two levels. Level two is positioned within the step provided by the container box and above the device, adding horizontal strength to the housing. The first level contains at least one o-ring seal in a recessed grove positioned between level two and the outer perimeter of the lid. The lid may further be removable, or attached to the housing using hinges or similar devices.

One embodiment includes the use of components to secure the lid to the container and to close the seal between the lid and container. A person skilled in the art is aware of multiple devices with which to secure a lid to a container, including buckles straps or clips. Such locking devices may be positioned on the lid, on the container, or may be positioned on both the lid and the container. In a preferred embodiment, the locking components comprise safety features preventing accidental opening of the lid during its use. Such safety features include any design with the intended purpose of preventing accidental opening of the lock, for example catches, push pins and rotary dials. In a most preferred embodiment, a buckle is specially designed to lock when snapped shut. In some embodiments, to unlock the device at least two fingers are required: one for holding down a safety latch and one for lifting the buckle.

Figure 2:
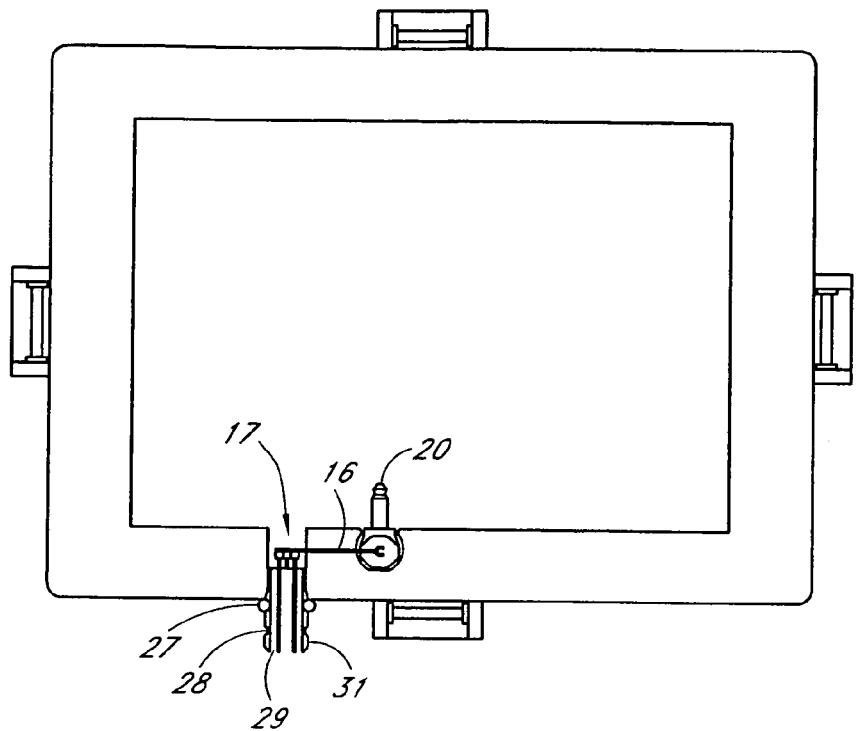
FIG. 2. A cross-section of the housing and a top view of the lid attached to the housing.
Figure 2:
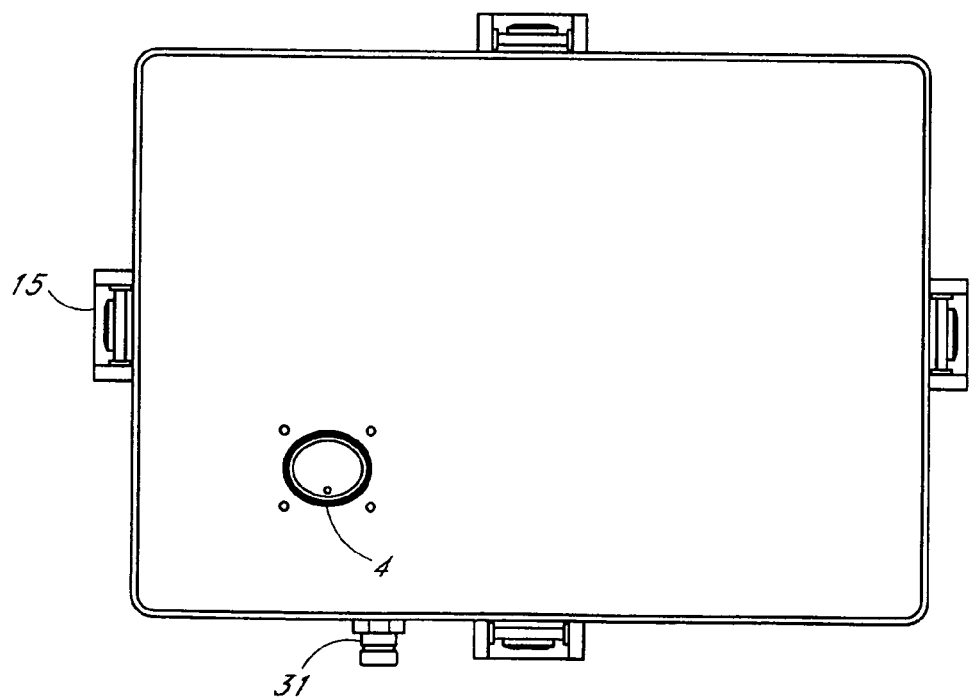
Figure 3:
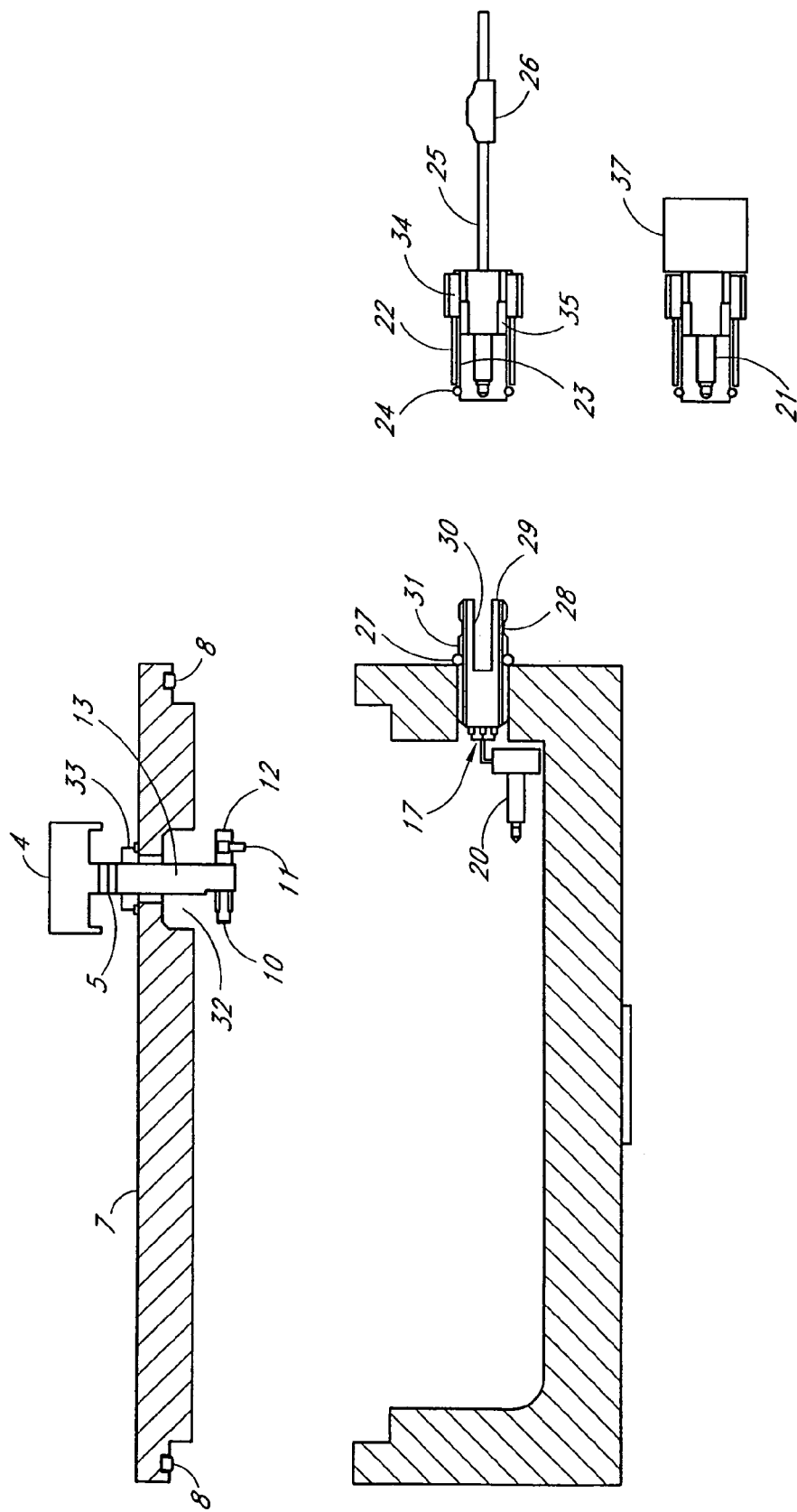
FIG. 3. A cross-section of the subject matter of FIGS. 1 and 2.

Without limiting the scope of the invention disclosed herein, one preferred embodiment of the disclosure is depicted in FIGS. 1 to 3. The submersible housing system of FIG. 1 is a container unit with a bottom, front, back, left, and right side designed to snugly contain an electronic device. The lid 7 is made of a rigid material, preferably clear, that fits over the top 19 left, right, front, and back edges of the container. In the face down side of the lid is an o-ring 8 that sits in a recessed grove along the perimeter of the underside of the lid. The compression contact between the o-ring and the top edge 19 of the housing provides the hydrostatic seal. The lid has two levels as seen in FIGS. 1 and 3. Level two is designed to sit above the device and within the step provided in the container box. This will serve the function of adding horizontal strength to the housing and ensuring the prevention of a change in structure, which could result in a break of the hydrostatic seal, causing a leak. The first level is designed to contain an o-ring 18 in a recessed grove located between level one and the outer perimeter of the lid on the face down side. This o-ring 18 will be compressed on the perimeter of the top 19 of the container box to make a seal that is not only water resistant and waterproof, but also submersible to one or more pressures absolute while maintaining a hydrostatic seal against the environment.

Figure 6:
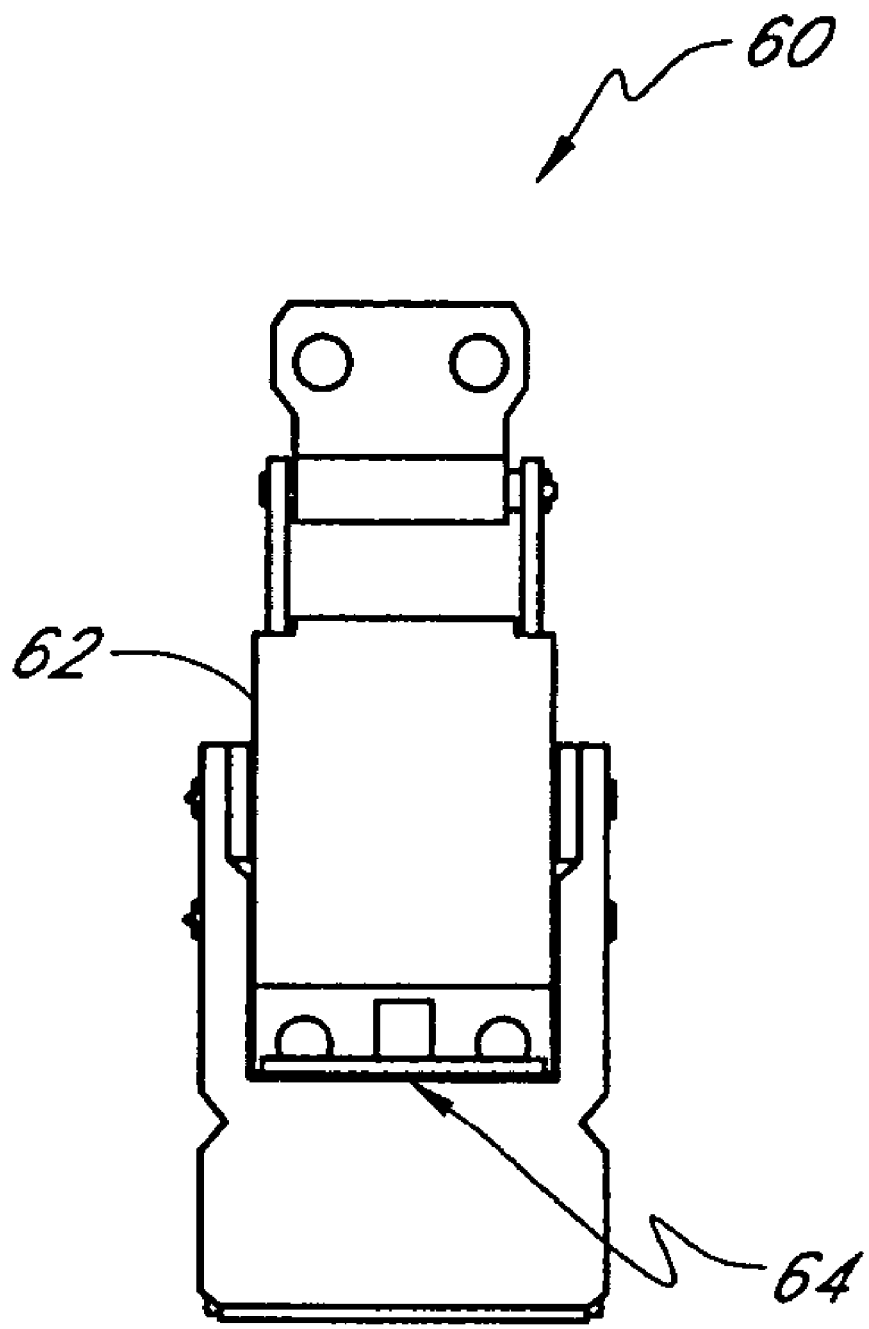
FIG. 6 is a schematic representation of an exemplary latch which may be used to secure the lid to the housing.

In order to secure the seal, the preferred embodiment will contain buckles 15 located on the peripheral exterior that will snap and lock the lid to the container. Such a buckle is manufactured by NEILSEN/SESSIONS® and is specially designed to lock when snapped shut, thus preventing accidental unsnapping of the buckle that could potentially release the lid from the container breaking the hydrostatic seal. To unlock the device, two fingers are required: one to hold down the safety latch down while the second finger lifts the buckle. FIG. 6 shows an exemplary latch 60 that may be alternatively used to perform the functions of buckles 15. Latch 60 may be, for example, a compression spring catch such as that manufactured by NIELSEN/SESSIONS® under product number I-HC83314-42LALBSS. In order to completely release latch 60, an operator must actuate a primary catch 62 as well as a spring loaded mechanism 64 (i.e., a secondary catch). If both catches 62 and 64 are not released, the latch 60 will not open. Hence, the design of latch 60 both ensures that the lid remains securely attached to the housing, and that the latch 60 will not be accidentally released.

In some embodiments, devices are provided that comprise one or more components that prevent water from reaching and damaging the audio device. Such components may act to prevent a leakage from occurring, or to reduce the damage of water should a leak have occurred. Such components may include external shock-absorbing structures, pressure release valves, multiple seals, internal walls creating waterproof compartments or chambers, and water-absorbing materials within the container.

Figure 7A:
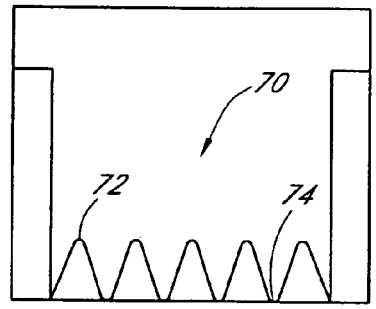
FIG. 7A is a cross-section of an embodiment of the housing comprising multiple peaks and troughs for protecting the device therein from water.
Figure 7B:
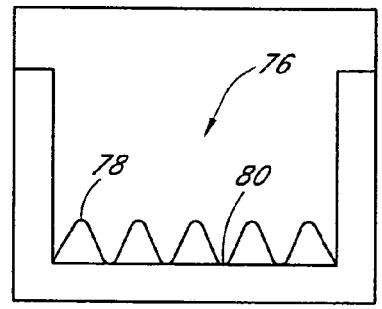
FIG. 7B is a cross-section of an embodiment of the housing comprising a removable lining for protecting the device therein from water.

FIGS. 7A-7D show alternative ways to adapt the lid 7 and the container shown in FIG. 1 to protect the audio device from water damage. FIG. 7A shows a cross-section of the container depicted in FIG. 1 having a surface 70 in the form of multiple peaks 72 and troughs 74. In this example, the surface 70 would be part of the housing itself, i.e., manufactured as one integral unit. An audio device would rest upon the peaks 72, thereby being isolated from any leaked water, which would pool in the troughs 74. FIG. 7B shows a cross-section of the housing having a protective surface 76 which resembles the structure shown in FIG. 7A. In this embodiment, however, the protective surface 76 would be a removable lining, i.e., not necessarily built into the housing. Such a protective surface 76 may be attached to the housing with an adhesive, for example. Protective surface 76 may be made of a water absorbing and resilient material in order to protect the device from both water damage and mechanical shocks. Similarly to the surface 70 described above, surface 76 would allow for the device to sit atop the peaks 78 while the water is collected and absorbed at the troughs 80.

Figure 7C:
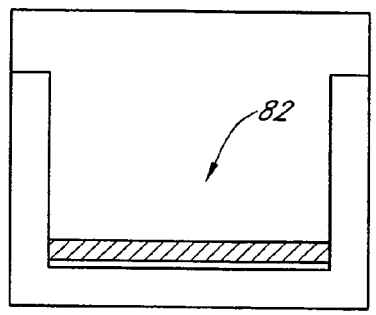
FIG. 7C is a cross-section of an embodiment of the housing comprising a water absorbing material

FIG. 7C shows yet another embodiment of the housing depicted in FIG. 1 having a protective surface 82. In this example, protective surface 82 is a lining of water absorbing material. Such water-absorbing materials include all compounds with desiccant or hydrophilic properties or any material with water-absorbing capacity, for example provided in the form of fabrics, sponges, foams, powders, pellets or similar. The material may be of synthetic or organic origin, or a combination thereof.

It should be noted that while the examples discussed above show only one surface of the container having the respective protecting structure 70, 76, and 82 this need not be the case. Rather, the protective structures can be on a portion of a single surface or on more than one surface or portion thereof. Thus, such protective structures may cover additional, if not all, surfaces of the container. Accordingly, the protective structures may be positioned at any desired location. Moreover, a person of ordinary skill in the art will recognize that the various protective structures 70, 76, and 82 (i.e. integral peaks and troughs, removable linings, or water absorbent materials) may be combined in a number of ways in a single housing unit. Hence, for example, the sides of the housing may be covered with protective surface 82 (water absorbing material), the top-inner wall of the unit may incorporate protective surface 70 (integral peaks and troughs), and the bottom-inner wall of the unit may be lined with protective surface 76 (removable lining).

Figure 7D:
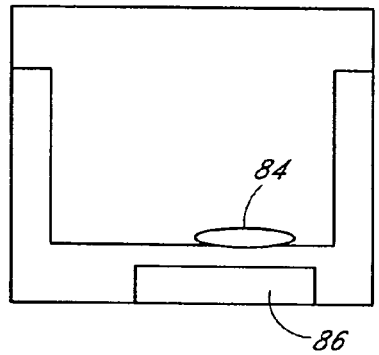
FIG. 7D is a cross section of an embodiment of the housing comprising a one-way valve.

FIG. 7D shows yet another embodiment of the housing having features to protect the internal unit from water damage in case of a water leak. In this embodiment, a one-way valve 84 is affixed to an inner surface of the housing unit. The one-way valve 84 allows water to pass from the inside of the housing to a water storage chamber 86. Since the one-way valve 84 allows passage of water in only one direction, the audio device is protected from water leakage in that the leaked water is removed to and stored in the chamber 86. A person of ordinary skill in the art will recognize that a variety of commercially available one-way valves may be used, and that the size, shape, and location of the chamber 86 may vary according to the desired design of the housing.

Some embodiments may further include the use of safety devices designed to increase the internal gaseous pressure of the container in case of a water leak. Without intent to limit the scope of the invention, such devices may include pressurized gas released upon leakage or chemical compounds, such as carbides, that produce gases upon exposure to water. In some embodiments, the invention comprises the use of one-way valves to reduce or increase the gaseous pressure within the container. Some embodiments include the use of any waterproof contrivance capable of conveying a one-direction flow of gas including, but not limited to, pressure release valves and vacuum release valves. In one embodiment the one-way valve is capable of withstanding the aquatic pressure exceeding one atmosphere.

In some embodiments, the invention comprises a moisture sensor within the container to detect water leakage into the container. One skilled in the art is aware of multiple types of sensors designed to detect an increase in humidity or moisture. The invention embodies any electrical moisture detection device including but not limited to led sensors or conductivity meters, and any chemical means of detecting moisture including, but not limited to, chromophoric substances.

In some embodiments, the invention comprises an internal lighting source to illuminate the device contained within. The invention is not limited to any particular source of light waves, but embodies any device that would achieve the intended purpose. For example, lighting sources include any electrical, chemical or biological process of producing light within the visible range. Such lighting sources may be mounted either on the outside or the inside of the container, or both. In some embodiments, fluorescently or similarly labeled components are used within or outside of the container to illuminate the device or to make one or more components of the device, for example the control knobs, visible under conditions of limited light.

In some embodiments, the device includes components for monitoring the operation of the audio device within the container. Such systems include, but are not limited to visual, chemical and electrical. In one preferred embodiment, the container is partially manufactured from a transparent material. Such materials include, for example, glass, PLEXIGLAS® plastics or other types of plastic. In another preferred embodiment, the container harbors circuitry that is capable of monitoring the electrical operation of the audio device. Such circuitry includes, but is not limited to, power meter, voltage meter, resistance meter and thermometer. For example, the circuitry may indicate whether a battery used to power the audio device is running low or to monitor other aspects of the operation of the audio device. In some embodiments, the device comprises components for communicating information on the operation of the electrical device to the user. Without limiting the scope of the invention claimed herein, such means include generation of audio signals and light signals, and visualization of instrument readings on a LED or similar display.

The invention embodies use of the container with any conceivable device capable of producing an audio signal or an audible sound. The invention embodies the use of any audio device including, but not limited to an audio player, iPod® device, MP3 player, CD player, cassette player, DVD player, communication device, telephone, cellular telephone, radio receiver, radio transmitter, computer, laptop computer, palm pilot, personal digital assistant, pager, measuring device, geiger counter, sonar, pH meter, thermometer, luminometer, magnetometer, or personal gaming device. In one embodiment, the audio device produces information on underwater sightings and points of interest relating to a specific underwater location. Such information may be stored on the audio device, or be received by the device from a source outside of the housing. For example, the information provided to the audio device or stored on the audio device may be used to provide an underwater tour of a specific location. In some embodiments, the device of the present invention comprises internal circuitry capable of receiving information from external devices such as a dive computer. In a preferred embodiment, the information received is communicated through the circuit to the user by, for example, light signals or audio signals.

Figure 8A:
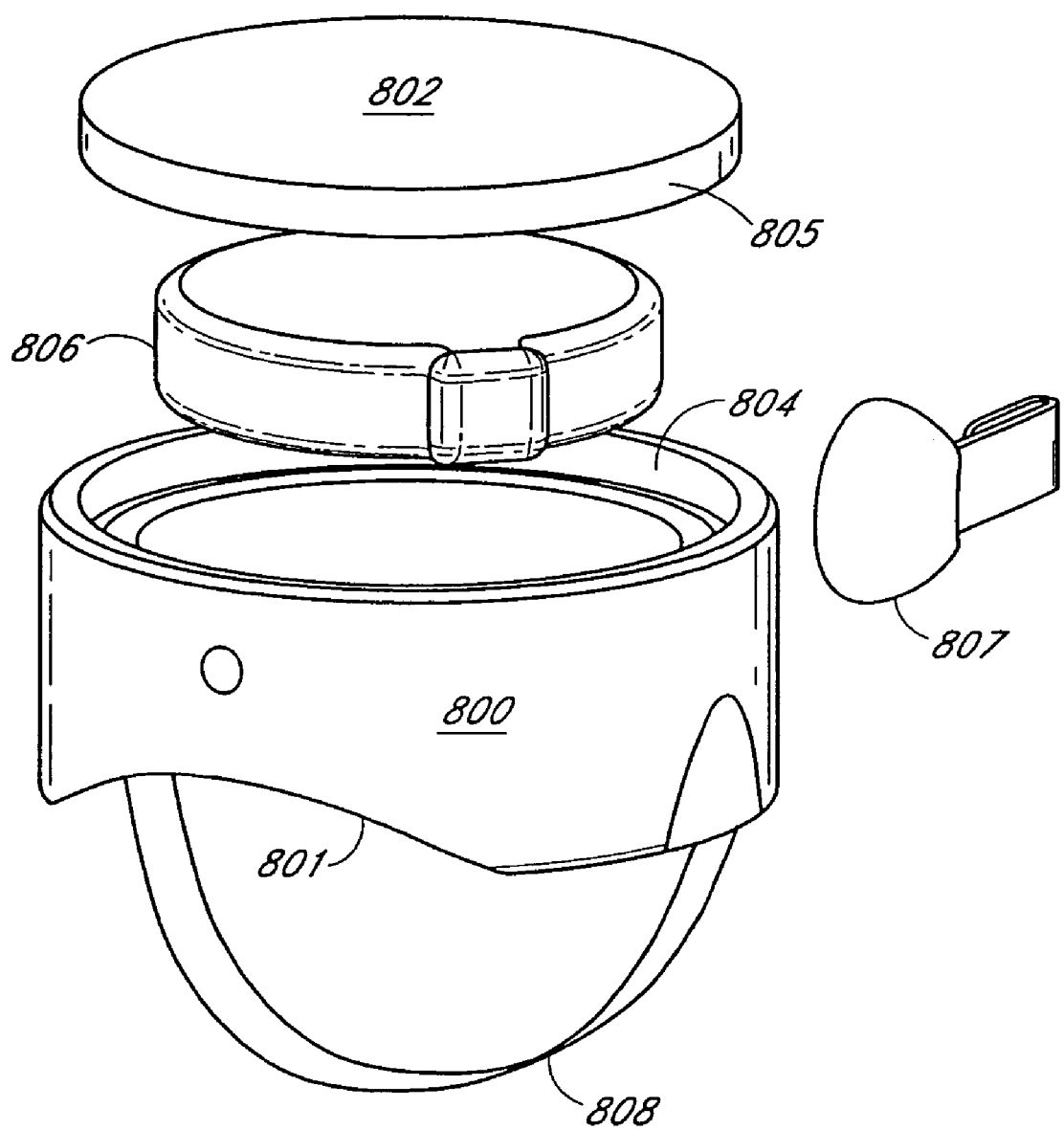
FIG. 8A is a three dimensional exploded view of an embodiment contoured to fit on the thigh and to hold a circular device.

In some embodiments, the device comprises components for attaching the container to the user's body or equipment. Such attachment features include, for example, straps, clips, hooks and various materials with adherent properties such as glue or tape. In one preferred embodiment, the container is provided with external features facilitating attachment to the user's body, for instance providing the container with an outer surface shaped to fit an appendage or other area of the body to which it is desired to affix the device. The container may be adapted to fit a leg, an arm or the thorax. FIG. 8A shows an example of a container 800 having a contoured surface 801 designed to fit over a thigh of a user. The contoured surface 801 may be pre-molded into the housing, or may be provided as a detachable piece that can be attached or removed depending on the type of use. In some embodiments, the features for attaching the device to the user's body may comprise a rigid surface configured to comfortably fit on the desired portion of the body or the features for attaching the device to the user's body may comprise flexible components which conform to the desired portion of the user's body. In the example of FIG. 8A, an elastic strap 803 is used to attach the container to the thigh of a user.

Figure 8B:
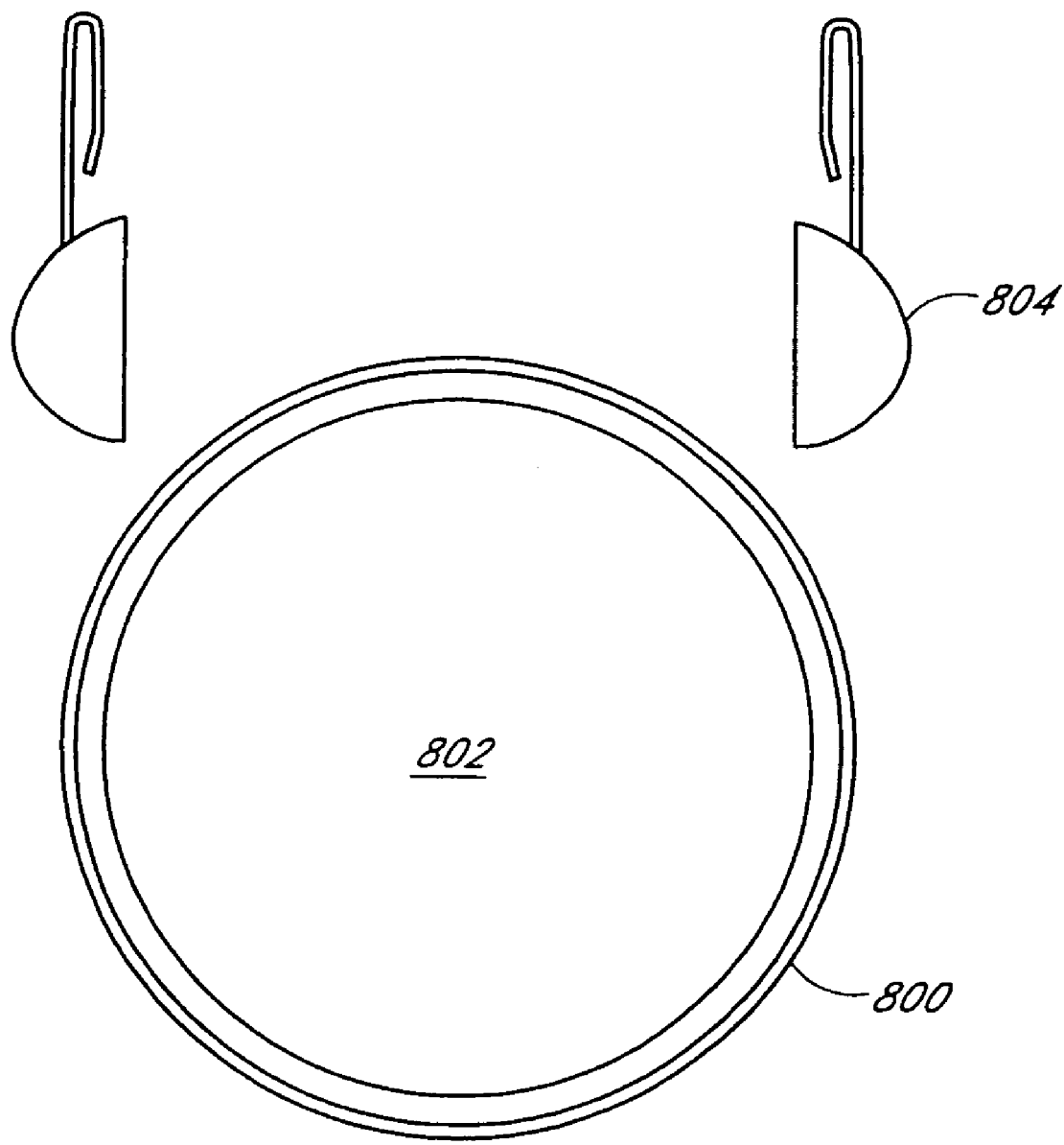
FIG. 8B is a top view of the device of FIG. 8A
Figure 8C:
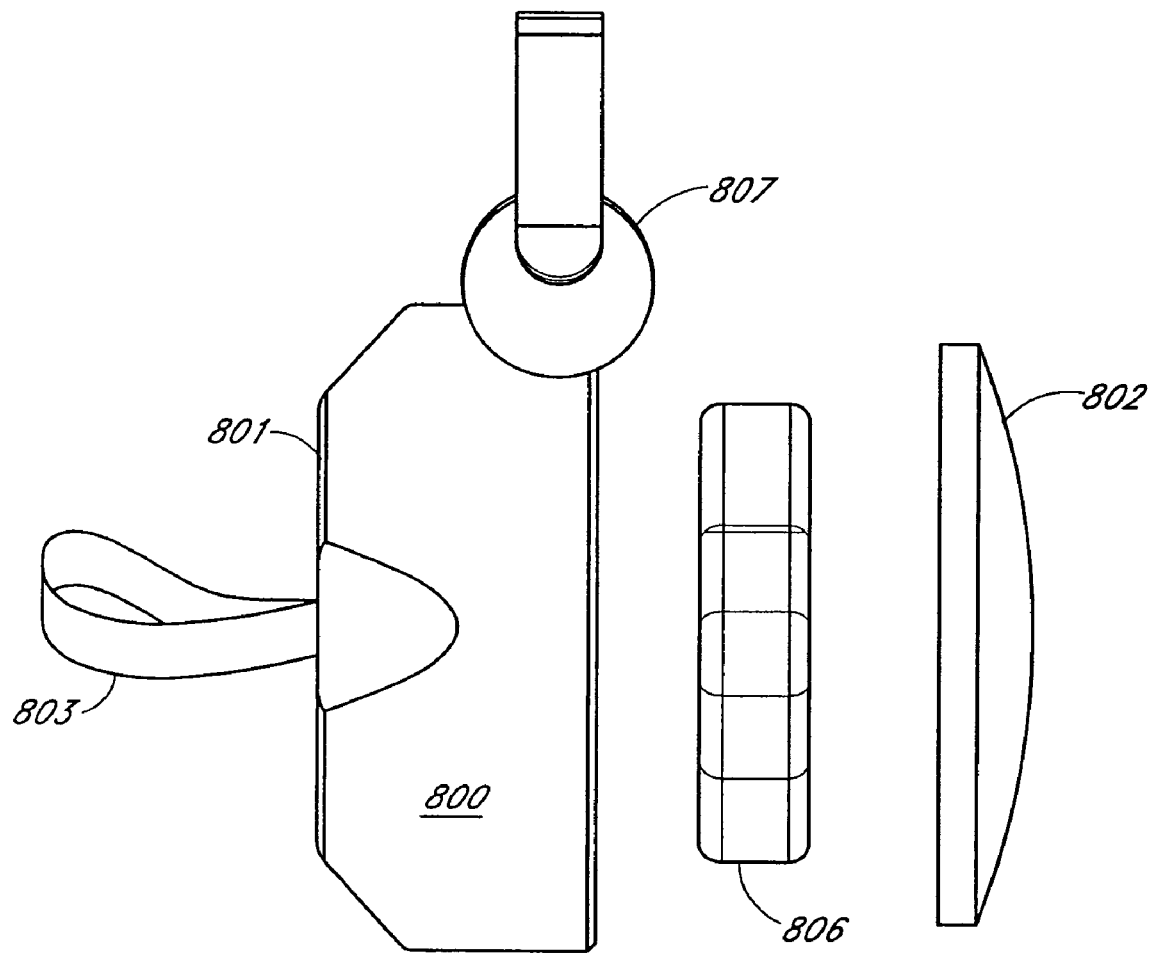
FIG. 8C is an exploded side view of the device of FIG. 8A.

With reference to FIGS. 8A-8C, an embodiment of the housing is shown having a round shape, as opposed to the rectangular shape of the housing shown in FIG. 1. In some embodiments, the round container 800 may have a threaded surface 804 to engage a threaded surface 805 on the lid 802. This embodiment allows for the storage of an audio device 806 inside the container 800 and lid 802 without the need for external latches or buckles. FIG. 8A also shows a speaker system assembly 807 to be used in conjunction with the housing and the device 806. FIGS. 8B and 8C show, respectively, the top and side views of the housing shown in FIG. 8A.

In some embodiments, the device of the present invention comprises components for manually controlling the device within the closed container. Such control devices may comprise components external to the container, components internal to the container, or both external and internal components. In some embodiments, the components are waterproof and/or capable of withstanding activation by water pressures encountered while submersed to depths including 3 feet, 10 feet, 30 feet, 50 feet, 100 feet, or 300 feet. Without limiting the scope of the invention, control components suitable for manipulating the device within the container include knobs, camshafts, push pins, soft rubber moldings and electronic control devices. In one embodiment the container or lid harbors one such external control device. In a preferred embodiment the container or lid harbors multiple external control devices. In a most preferred embodiment, the container or lid harbors a number of control devices spatially arranged so as to optimally operate the controls of a specific audio device within the container. In one preferred embodiment, the external control components are capable of horizontal and vertical movement, and capable of generating both horizontal and vertical movement of the internal components of the controlling device. In a more preferred embodiment visualized in FIGS. 1-3, a control knob 4 allows the user's to rotate an internal pressing device 11 so that a push button controller on the entertainment device can be activated externally while maintaining a hydrostatic seal against the environment. In an arbitrarily located position, relevant to the device sitting in the housing system, a control knob 4 made of a rigid material is placed through the lid 7 to allow exterior manipulation of the activation devices of the device. The control knob system is a comprised of a camshaft 13 surrounded by an o-ring housing 33 with a knob 4 on the exterior end, and a hex screw 10 caddy 12 and a presser 11, on the interior end. Thus, the presser structure 11 can be positioned anywhere along a 360 degree location on a horizontal axis by turning the knob 4 in the rotation chamber 32. The vertical position can be manipulated from the exterior by pressing the knob 4. In order to deal with the constant inward pressure, an exterior spring 5 pushes the knob back up to its original position. The result is a vertical and horizontal movement control of the caddy 12 and presser 11 used to control the interior device.

Figure 9:
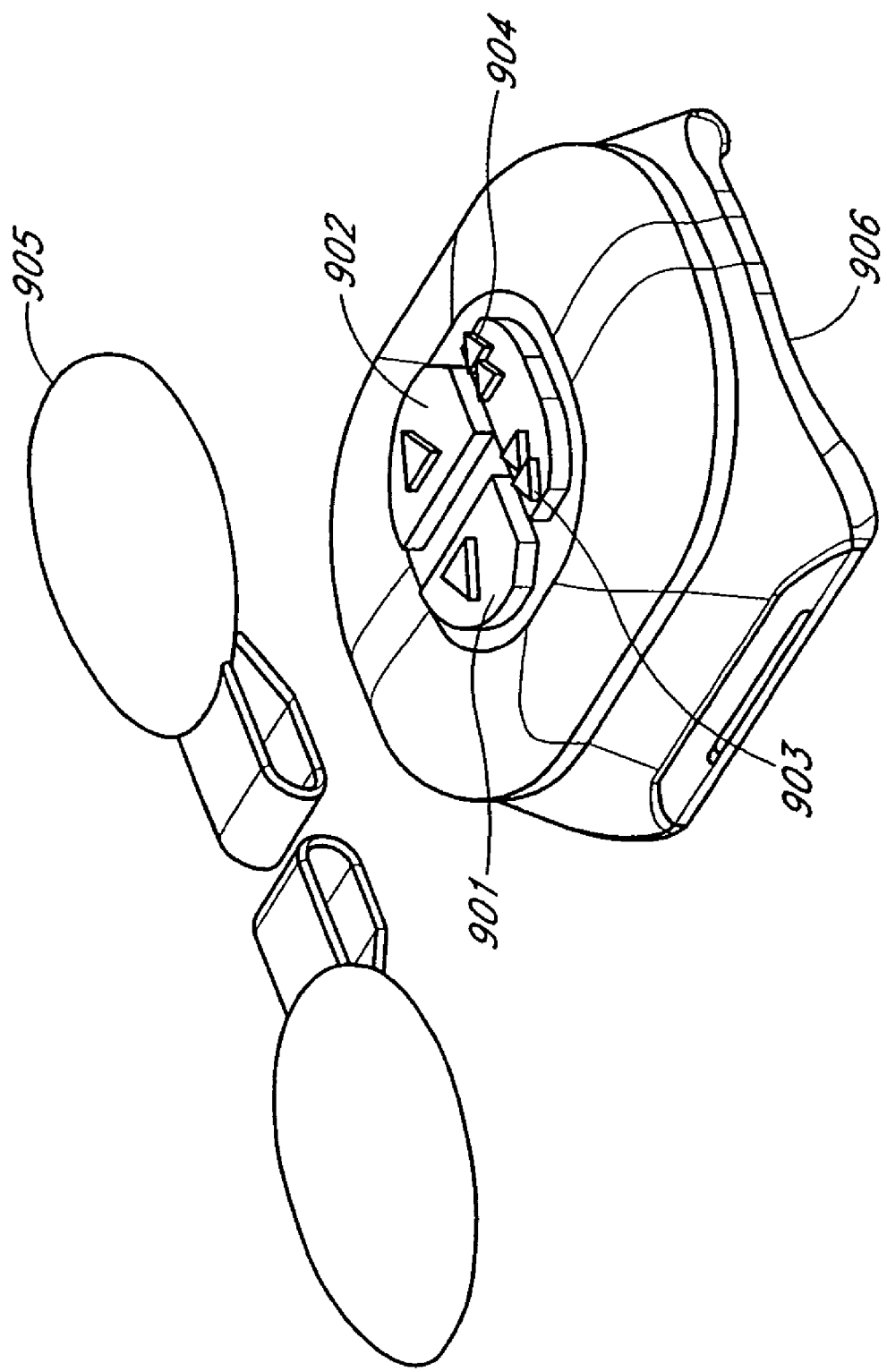
FIG. 9 is a schematic representation showing another embodiment of the housing of FIG. 1.

A person of ordinary skill in the art will recognize that the shape of the control knob 4 need not be limited to that already described. For example, FIG. 9 shows an embodiment of the housing unit having controls 901, 902, 903, and 904 whose shape may closely resemble the function of the control buttons on the entertainment device. Hence, control 901 may interact with the analogous "rewind" control of the audio device. Similarly, control 902 may actuate the "forward" button of the internal control device. While the external configuration of the controls of the housing may adopt any of a variety of shapes, the actuating mechanism that allows for waterproof operation may be the same as already described above. FIG. 9 also shows a speaker system assembly 905. FIG. 9 also depicts an embodiment of the housing having a surface 906 that is adaptable to be worn on an appendage, e.g., a thigh, of a user.

In some embodiments, the invention further embodies components for connecting the internal audio device to an audio output adapter. The audio output adapter may include, but is not limited to, an audio jack including RCA jacks or a 3.5 mm stereo jack, USB port, Ethernet RJ45 port, Firewire, phone jack, multipin serial connection, wireless transmitter. Such components include a cable or wireless transmission to a device capable of forming a connection with an audio communication link. The audio communication link provides for communication between the audio output adapter and a sound generating device, such as an earphone. The audio communication link may include a wired link or a wireless link.

Positioning of an audio jack may be on the inside of, on the outside of, or within the housing. In some embodiments, the invention also comprises components that are waterproof and components that can withstand water pressures. In some embodiments, the invention comprises the use of any coupling mechanism capable of achieving the purpose of connecting the audio device to an audio communication link including, but not limited to, pneumatic coupling, threaded coupling, snap-in, push-in, lock-in and permanent. In a preferred embodiment, the wires from the stereo jack make a connection to a stereo jack adapter located in the body wall of the housing. The stereo jack adapter sits within the bore of a male hydraulic nipple that lies flush with exterior end. An o-ring between the body wall and the male hydraulic nipple establishes a hydrostatic seal.

In a further embodiment of the invention, components connecting the audio jack to an audio communication link are provided. In some embodiments, the invention also comprises components that are waterproof and components that can withstand water pressures. The invention further comprises the use of any coupling mechanism capable of achieving the purpose of connecting the audio jack to an audio communication link including, but not limited to, pneumatic coupling, threaded coupling, snap-in, push-in, lock-in and permanent. In one preferred embodiment disclosed in FIGS. 1 to 3, a stereo jack 20 plugs into the device so that the sound is transmitted from the device through a short flexible slack of cable 16. This will allow the electronic device to be easily connected, and inserted in the housing. This also allows the flexibility and adaptability function by using any type of device that is equipped with an audio jack. The wires from the stereo jack 20 make a connection 17 to a stereo jack adapter 30 located in the body wall 18 of the housing. This stereo jack adapter sits within the bore of a male hydraulic nipple 31 that lies flush with exterior end. There is an o-ring 29 between the body wall 18 and the male hydraulic nipple 31 that establishes a hydrostatic seal. This entire stereo jack adapter is designed to screw into the body wall and serves as a means of providing an easily replaceable, and fixed, pressure resistant audio jack adapter that can withstand water pressures while maintaining a hydrostatic seal against the water environment, and, that plugs into a stereo device. Coupling to the male hydraulic nipple 31 is the female hydraulic coupler FIG. 3 that has a built-in stereo jack 21. The female coupler is snapped over the male hydraulic nipple with a locking bearing 24 mechanism to establish a hydrostatic audio connection by means of a locking mechanism to the male coupler. This operates by sliding the outer shell 22 away from the port. This action allows the internal ball bearing 24 to slide out from the interior through the holes in the interior shell when inserting the male nipple 31 into the female coupler 21. As such, a secure connection is established. This occurs because the jack 21 that is inside the female coupler fits into the adapter 30 within the male coupler. Releasing the sliding shell 22 causes the internal spring 34 to push the outer shell 22 towards the port whereby the ball bearings 24 are once again pushed through the holes in the interior shell 23. The ball bearing 24 then fit into the groove 28 of the male coupler, preventing the two units from separating. A hydrostatic seal is established by this juncture. The female coupler contains an o-ring 35 inside to provide a hydrostatic seal capable of withstanding one or more pressure absolute. The flat, front edge, of the male coupler makes contact with the o-ring. When the sliding shell 22 is released and the ball bearings fit in the groove 28, it initiates a small degree of compression on the juncture that drives the front edge of the male couple deeper into the internal o-ring 35 of the female couple. Thus, a hydrostatic seal is established that provides for a pressure resistant and waterproof juncture between the male and female adapters. This unit has the benefit that it can rotate around the axis without breaking the seal. In addition, this unit will allow the user to completely disengage and reestablish the connection underwater without flooding and damaging the interior of the housing because the male and female hydraulic couplers are completely internally sealed components. The male coupler contains a solid flexible filling 29 such as silicone or rubber, which prevents water from entering. The female coupler contains a thick o-ring 35 internally. This is important because if for any reason the cable pulls apart from the housing then the housing unit will not flood and destroy the electronic device.

In some embodiments, the device of the present invention comprises an audio communication link between the housing and a device capable of generating audible sound. Without limiting the scope of the invention disclosed herein, said audio communication link may transmit any signal capable of being converted into audible sound, including audible sound itself. The link may further convey an analog or digital signal. In some embodiments, the link may be comprised of any material capable of conducting an electronic signal, including copper, silver and gold, or other material capable of conducting a digital signal such as a fiberoptic cable. In another embodiment, the audio communication link may comprise a wireless signal, such a radiofrequency signal. In one preferred embodiment, the audio communication link is provided with a volume control. The term volume control as used herein is intended to include any device capable of regulating the value or strength of the signal generated by the audio device, including but not limited to variable resistors and power amplifiers. In another preferred embodiment, the audio control comprises a device capable of amplifying the signal from the audio device. Such devices include, but are not limited to amplifiers and power modulators. The invention further embodies the use of any device capable of modulating the nature, amplitude, frequency or clarity of the signal produced from the audio device. Such devices include, but are not limited to A/D converters, D/A converters, equalizers and DOLBY® or similar sound manipulation systems. A wireless communication link such as the BLUETOOTH® system is also within the scope of the present invention. One embodiment is described in FIGS. 1-3. One or several submersible and pressure resistant cables 25 from the female stereo jack runs up to an exterior volume control 26 comprised of a variable resistor. The audio cable is made of material capable of transmitting audio data. This material can range from copper to fiber optics. This cable is covered with a non-permeable flexible membrane. Between the housing coupling unit and the speakers, in the cable, can be positioned a variable resistor 26 in the cable for adjusting the volume of the earphones. The resistor circuitry will allow for modulation of the audio level to the speakers. Furthermore, the circuitry is within a permanently sealed housing that can withstand one, or more, absolute pressures.

In some embodiments, the device of the present invention comprises components for connecting the audio device to any of several devices capable of producing sound. Such devices include, for instance, loudspeaker elements, electrostatic transducers, bone conducting devices, and ultrasound-generating devices. The invention embodies the use of any type of loudspeaker element capable of producing audible sound, including but not limited to magnetic elements, piezoelectric elements and electrostatic transducers.

In some embodiments, the device of the present invention comprises an underwater headset comprising at least one speaker within a waterproof enclosure, wherein the enclosure is adapted for vertical and horizontal and rotational positioning. The headset may be attached to the user's head, or to the user's equipment such as face mask, mask strap or hood or to any other desired location. In one embodiment, the speaker is mounted on a member capable of horizontal and vertical movement. The member may be comprised of a rigid or flexible material such as plastic, rubber or metal. Any type of device capable of producing sound, including loudspeaker elements, electrostatic transducers, bone conducting devices, and ultrasound-generating devices, may be used. Any type of loudspeaker element capable of producing audible sound, including but not limited to magnetic elements, piezoelectric elements and electrostatic transducers may be used. In one preferred embodiment, at least one speaker is capable of operating with a frequency between 20 Hz and 25 kHz. In another preferred embodiment the headset is provided with multiple speaker elements covering a wide frequency range.

In one embodiment, the output from the midrange speaker of a multiple-speaker construction, or the midrange register of a single-speaker construction, is amplified. The terms "midrange" and "midrange register" are used herein as defined by the usage of one skilled in the art. In some embodiments, a waterproof enclosure surrounds the speakers. Such enclosure may be made from any rigid or flexible waterproof material, including plastic, rubber or metal. In a preferred embodiment the enclosure is capable of withstanding underwater pressures. In another preferred embodiment, the waterproof enclosure comprises a water-resistant membrane or diaphragm capable of transmitting audible sound. Such membrane may be made from, for instance, fiber-reinforced epoxy, polyester or ABS resin. In some embodiments, the device of the present invention comprises various control devices including, but not limited to, an on/off switch, a volume control or an amplifier.

In some embodiments, the device of the present invention comprises a wireless receiver system attached to the user's headset. Any wireless receiver connected to any analog converter capable of sending an audio signal to the speakers may be used. Other embodiments include the use of additional control devices including, but not limited to, an on/off switch, a volume control, memory for buffering data, and an amplifier. In some embodiments, the wireless receiver system is incorporated into the speaker housing.

Figure 4:
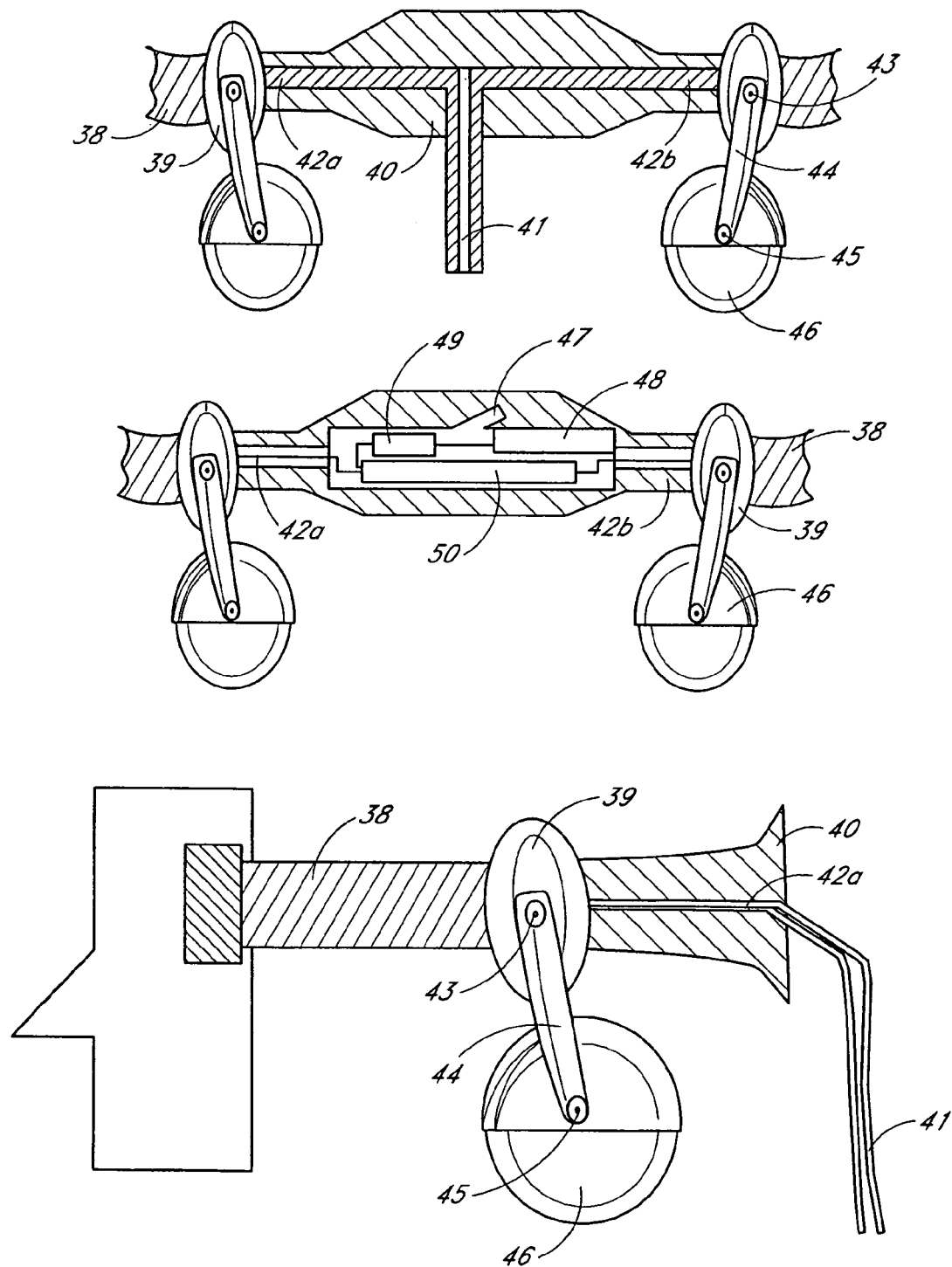
FIG. 4. Plan and side view of the head mounted speaker system assembly, wherein the side view includes an underwater mask and strap.
Figure 5:
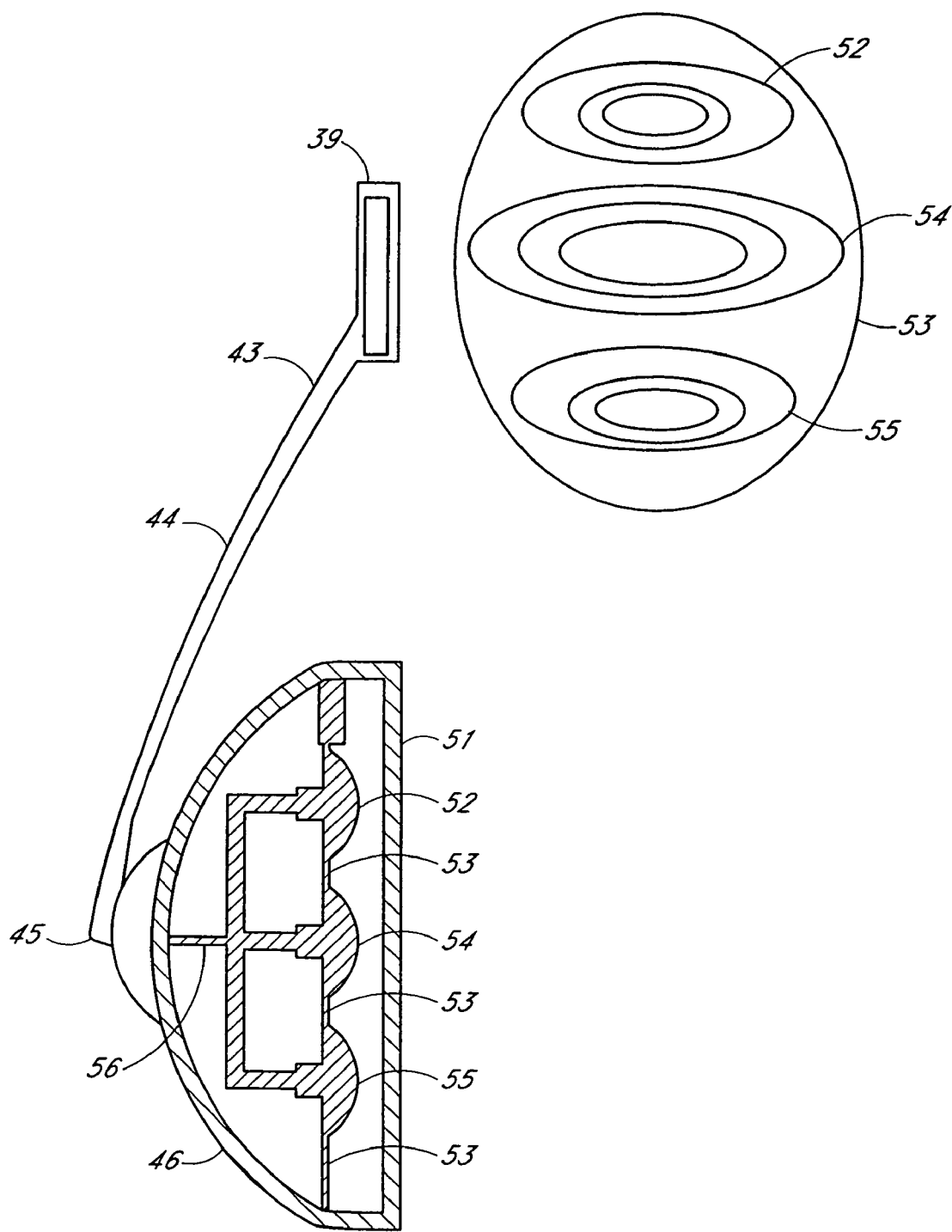
FIG. 5. A cross-section and front view of the speaker system assembly.

Some embodiments are disclosed in FIGS. 4 to 5. The headset utilizes a frame 39 to which the speaker arm 44 is mounted. The frame is rigid and comprises a swivel 43 and a hollow chamber through which a mask strap feeds. This will allow for horizontal adjustment by sliding, and for vertical adjustment by rotating the arm of the swivel. Thus, a user can position the speaker to personal and custom coordinates. The speaker arm 44 is a concave frame with speakers 46 mounted on the ends. Angular adjustments allow the user to specifically orient the speakers in three-dimensional space to suit personal coordinates. In this embodiment, the user can position the speakers near the ears, directing the sound waves into the ear canal but not restricting the canal passageways. This feature is particularly useful for divers such as SCUBA or skin divers, allowing the diver the ability to equalize pressure of the sinus and ear canals with the ambient pressure of the environment.

Figure 10:
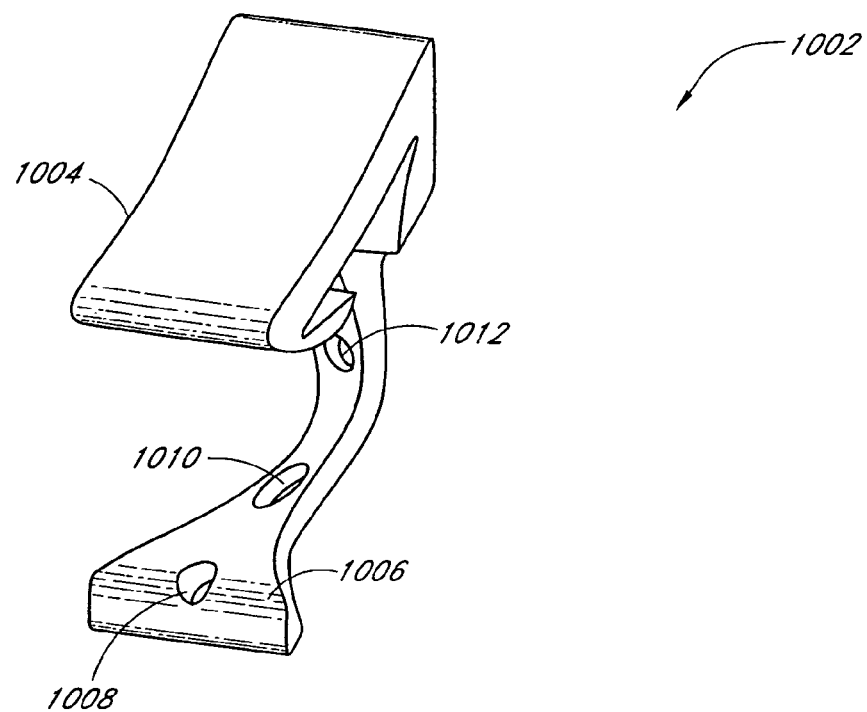
FIG. 10 is 3-dimensional rendering of an exemplary frame for attaching the speaker housing of FIG. 5 to the strap of an underwater mask.
Figure 10:
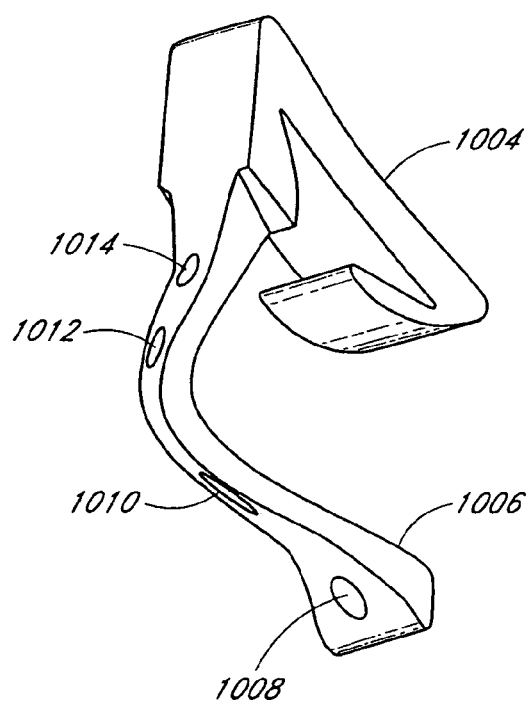

FIG. 10 shows two views of a frame 1002 which may be utilized with the speaker system assembly of FIG. 5. In this embodiment, the frame 1002 consists of a portion 1004 for attaching the frame 1002 to the mask strap of a user wearing an underwater mask, such as a snorkeling mask, diving mask, or swimming goggles. The frame 1002 further consists of a portion 1006 to which the speaker housing may be affixed using, for example, a screw-hole 1008. The frame 1002 may be further provided with through holes 1010, 1012, and 1014 for threading through a physical communication link between the speaker housing and the audio device housing shown in FIG. 1. Frame 1002 may be made from a rubber material to provide both firmness and elasticity, as well as a soft feel. Alternatively, frame 1002 may be made of suitable plastic or aluminum materials.

The wire cable runs through the membrane 46 of the securely sealed speaker housing to the piezoelectric 52, 53, 55 ceramic speaker elements with a 20 Hz to 25 kHz frequency range. This range is advantageous in the design of the speakers because they can work with an amplifier to correct for aquatic dampening effect. The three speakers are designed to operate at fidelity levels heard out of water, while underwater. Due to the dampening effect of water, the frequency ranges for the dampened wavelengths are compensated. Thus, out of water, the audio may not sound normal. However being underwater, they provide fidelity without loss of clarity. A rigid yet nondense diaphragm 51 comprising of such materials as fiber-reinforced epoxy, vinyl, mylar, polyester, ABS resin or the like, covers the speakers covers the outside. This will allow the sound to travel through the diagram with the least resistance and serve to move the diaphragm for increased sound fidelity. It is a permanent structure and should be sealed and fixed.

In another embodiment shown in FIG. 4, a wireless receiver system is equipped into the mask strap system. A wireless receiver 49 is connected to an analog converter 50, which then send the audio signal to the speakers via cables 42a, 42b. A switch 47 allows the user to control the power. The switch is covered with a flexible nonpermeable membrane that can toggle to an on or off position. A battery 48 provides the power to wireless receiver system. The battery is secured from the environment within the receiver system and can be easily replaced by unscrewing a side port lid and sliding the battery out for replacement. The interior circuitry 56 of the speakers 52, 54, 55 is coated with a nonconductive, marine grade material to prevent corrosion and damage. By using, piezoelectric, bone conduction, or ultrasonic mechanisms, high fidelity is accessible. The purpose of having several speakers is to be able to compensate for the fidelity loss caused by the water. In the embodiment represented in FIG. 5 the mid-range frequency speaker provides greater signal amplification than the low range 55 and high range 52 speakers. Thus, in effect, the audio fidelity heard underwater is maintained by over amplification of dampened frequency ranges. For those seeking to use a system that maintains the highest audio fidelity while underwater, this device provides enhancements over other systems.

Figure 11A:
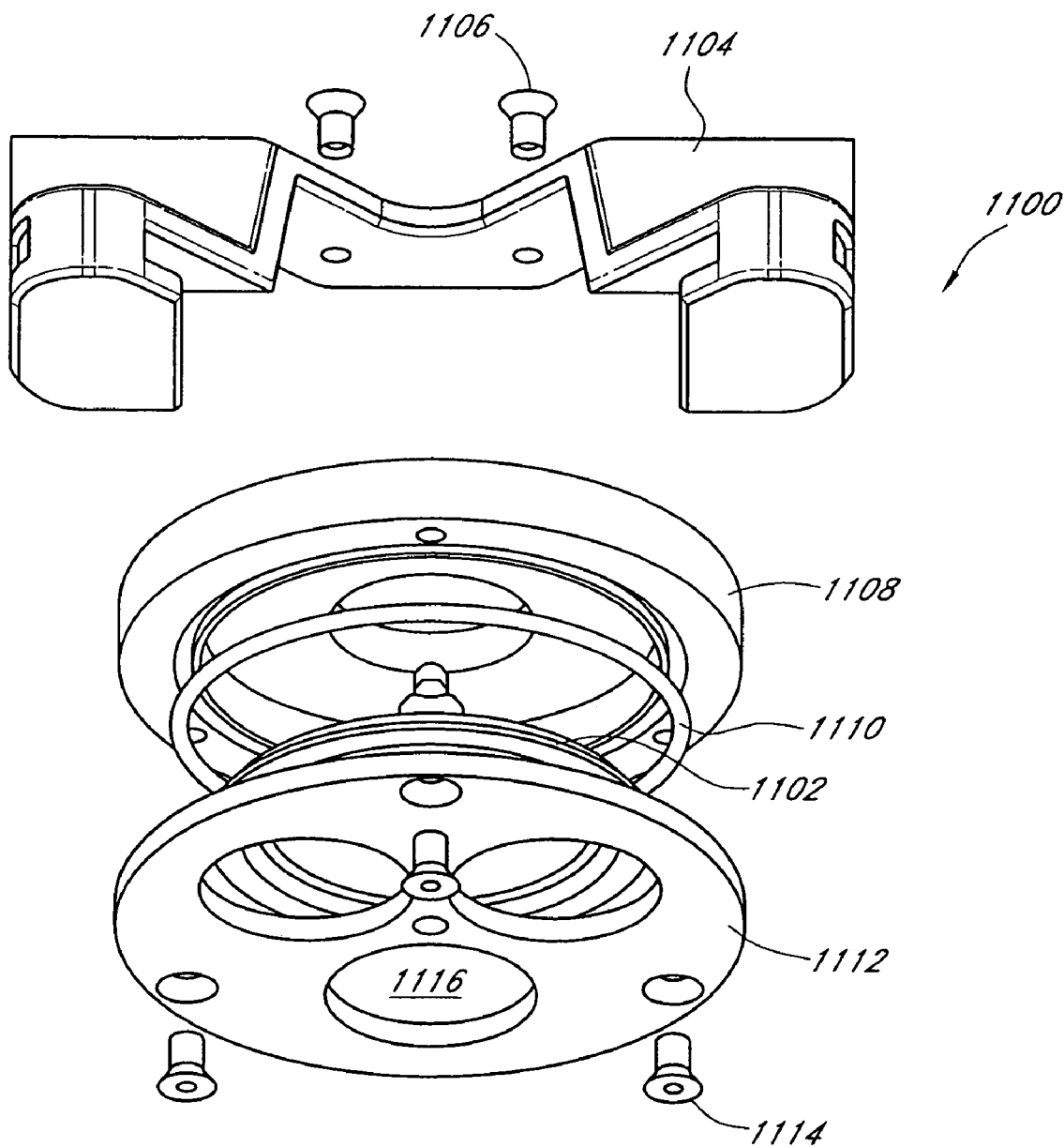
FIG. 11A is an exploded three dimensional view of a speaker system assembly.
Figure 11B:
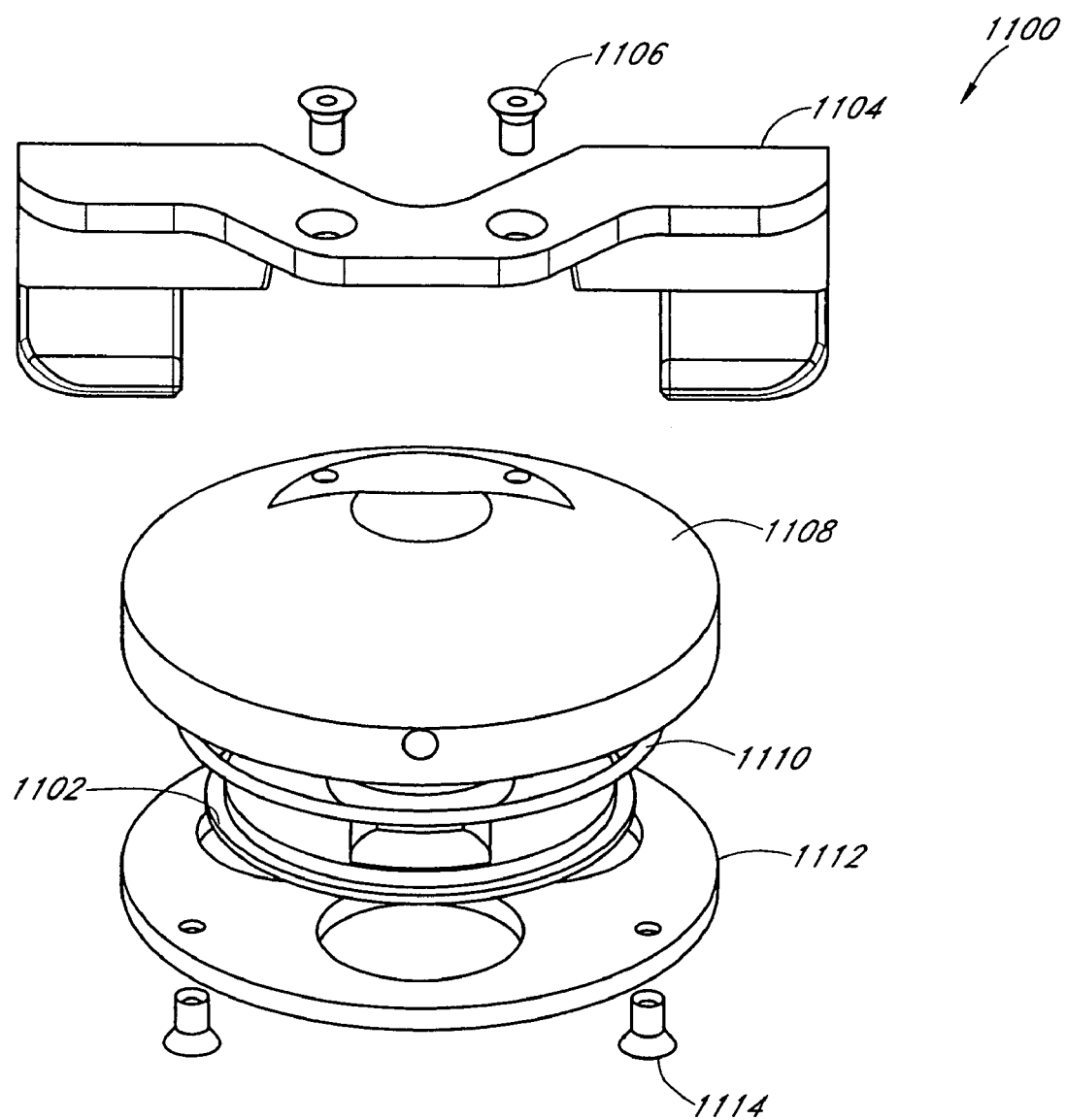
FIG. 11B is a three dimensional view of the speaker system assembly of FIG. 11A.
Figure 11C:
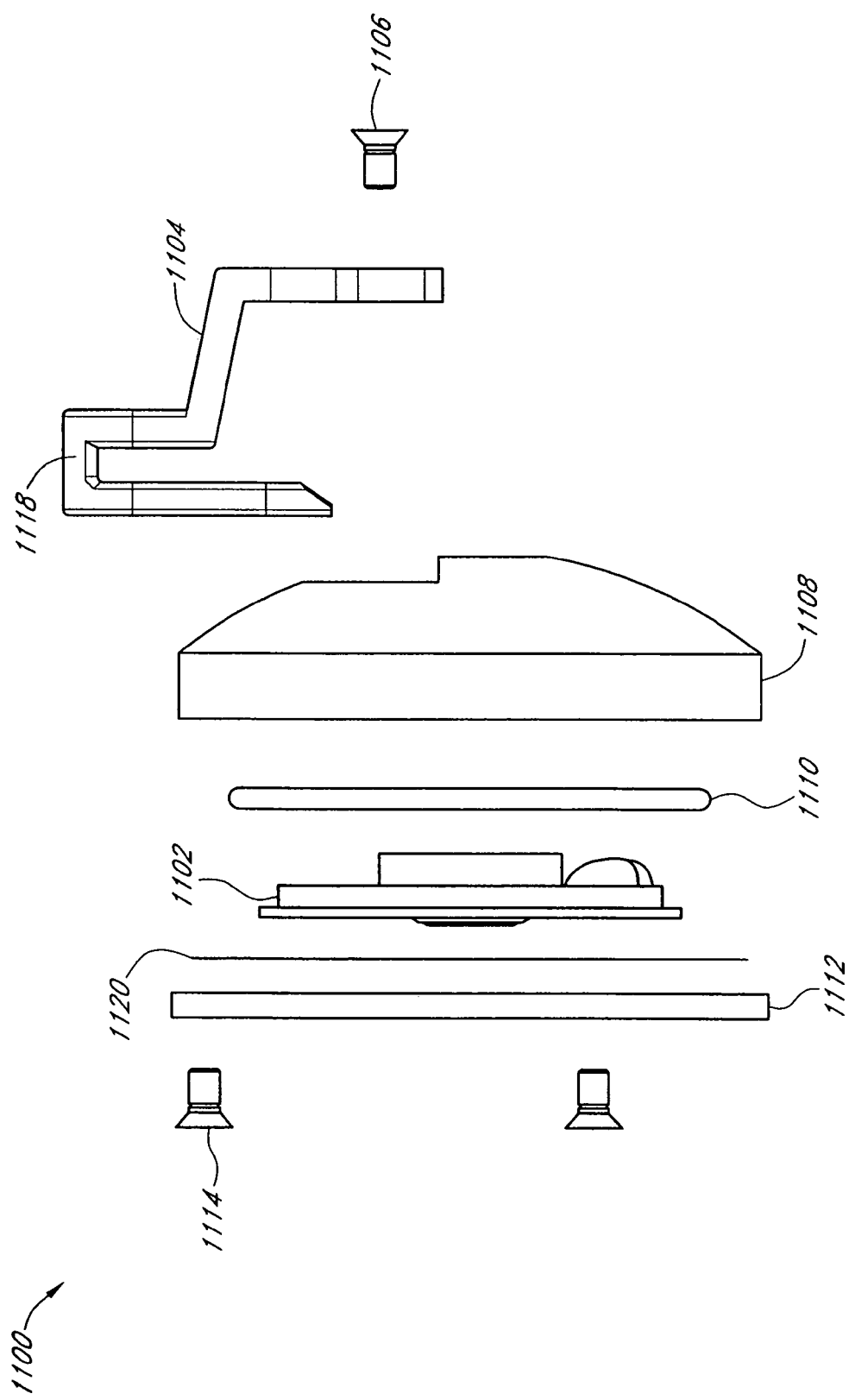
FIG. 11C is an exploded side view of the speaker system assembly of FIG. 11A.

FIG. 11A shows an exemplary embodiment of a housing 1100 for a speaker 1102 that may be used with the personal audio system disclosed herein. The speaker housing 100 may consist of a mask clip 1104 for securing the speaker and its housing to the mask strap of a user's mask. The mask clip 1104 includes screws 1106 for fastening the speaker housing assembly to the mask clip 1104. The mask clip 1104 may be made of a material such as rubber or light-weight aluminum. The mask clip 1104 is designed to securely engage to a user's mask strap. For example, with reference to FIG. 11C, the mask clip 1104 has a portion 1118 shaped like an inverted "u" in order to engage the user's face mask. The speaker housing 1100 further includes a housing base 1108 for setting the speaker 1102 therein. The housing base 1108 includes a concave portion for receiving the speaker 1102. The housing base 1108 may be made of a plastic, metallic, or rubber material. The housing 1100 may also include o-rings 1110 and 1120 to ensure that the housing 1100 remains waterproof, thereby protecting the speaker 1102. A person of ordinary skill in the art will recognize that many commercially available o-rings will serve the desired function. In other embodiments, the housing comprises a gland seal or a face seal. The housing 1100 may also include a housing lid 1112 to engage the housing base 1108. The housing lid 1112 has at least one aperture to permit sound transmission from the speaker 1102 to the ear of a user. FIG. 11A shows a speaker housing lid 1112 having three apertures 1116. The housing lid 1112 may be made of the same materials as the housing base 1108. Furthermore, the housing lid 1112 may be secured to the speaker housing base 1108 by, for example, a group of screws 1114. It will be apparent to a person of ordinary skill in the art that the exemplary embodiment for the speaker housing assembly 1100 discussed here may be implemented in a variety of ways. What is relevant is to provide a speaker assembly system that includes a means for attaching the speaker housing to the user's mask (e.g., the mask clip 1104) as well as a waterproof housing means (e.g., housing base 1108, o-ring 1110, and housing lid 1112) to protect the speaker 1102. FIGS. 11B and 11C respectively show a perspective view and a side view of the housing assembly 1100.

In yet another embodiment of the invention, an underwater headset comprising at least one speaker within a waterproof enclosure, wherein said at least one speaker is mounted on a frame that attaches to the ear, is provided. One skilled in the art is aware of multiple means for attaching a device to the ear, including, but not limited to, a component wrapping around the ear, a component clipping to the ear or a component being inserted into the ear. The invention embodies the positioning of speakers outside of the ear, or inserted into the ear canal. Any rigid or flexible materials may be used in the manufacture of the enclosure. In one preferred embodiment, said enclosure is capable of withstanding underwater pressures. In another preferred embodiment, the waterproof enclosure is made from a flexible material, such as rubber, plastic, or silicone. In a most preferred embodiment, the flexible material is capable of forming the shape of the user's ear canal.

Figure 12A:
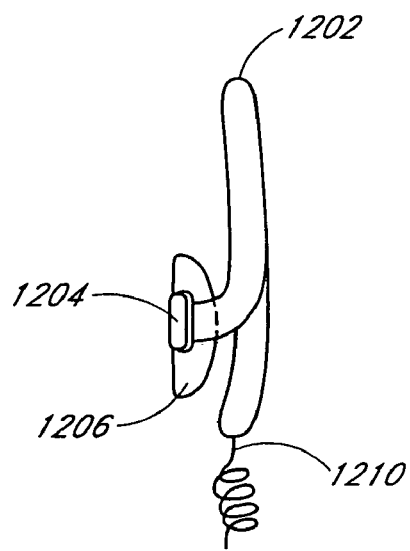
FIG. 12A illustrates a speaker system assembly adapted to clip on the ear of the user.
Figure 12B:
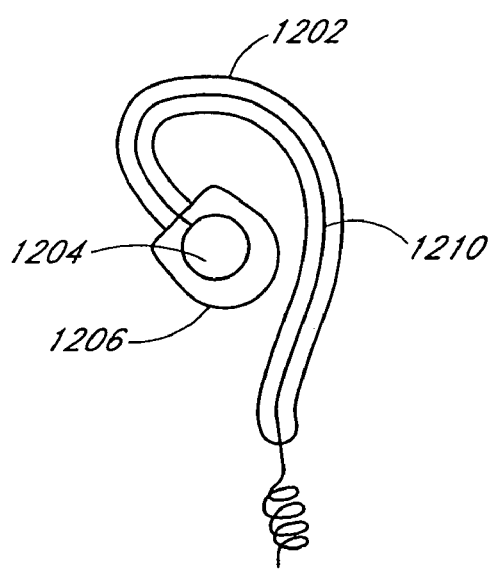
FIG. 12B is a side view of the speaker assembly system of FIG. 12A.
Figure 12C:
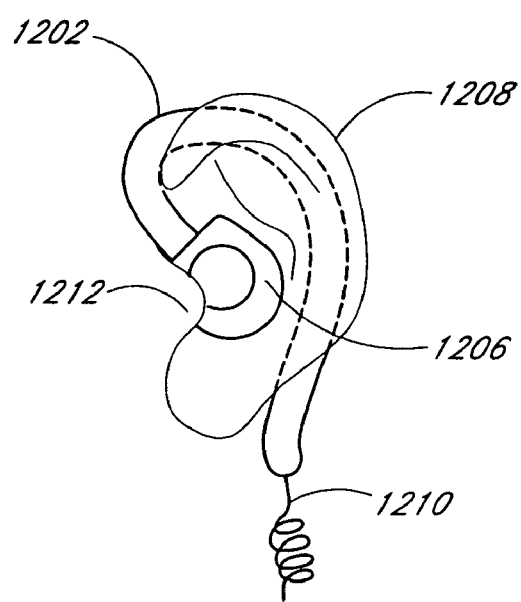
FIG. 12C illustrates the speaker assembly system of FIG. 12A positioned on the ear of a user.

FIGS. 12A-12C show an embodiment implementing a speaker system assembly having an ear clip 1202 attached to a speaker housing 1204 and integrating a moldable piece 1206 that conforms to the shape of the outer ear 1212 of a user. The ear clip 1202 is designed to wrap around the ear lobe 1208 of a use for supporting the speaker assembly 1204 securely yet comfortably. The ear clip 1202 may be made of a soft-molded rubber, and it may be manufactured such that it accommodates a physical communication link 1210 connecting the speaker system assembly 1204 and the housing shown in FIG. 1. The moldable piece 1206 may be made of a soft gel which molds to the shape of the outer ear 1212 of a user. The moldable piece 1206 may be one such as that manufactured by JABRA Corporation under the trade name JABRA Ear-Gels® or Slic™Sound ear gels available from SlicSound. The ear gels may allow the audio signal to reach a user's inner ear while at the same time protecting the speaker system 1204 from the elements, such as a water environment.

Additional control devices including, but not limited to, an on/off switch, a volume control or an amplifier may be included. The invention further embodies the use of any type of device capable of generating sound, including, but not limited to, piezoelectric, magnetic, electrostatic transducers, bone conducting and ultrasound.

In some embodiments, a power amplifier is provided to help compensate for the effects of pressure on speaker elements. At increasing underwater depth, the water pressure limits the movement of speaker elements, which decreases the volume of the sound output from the speakers. The power amplifier can be used to increase the volume of the sound output from the speaker elements by increasing the audio signal produced by the audio device. For example, the amplifier can receive as input the audio signal produced by an electronic device capable of producing an audio signal and provide as output to speaker elements an audio signal with increased power, thus enhancing the fidelity and volume of the sound produced by the speaker elements. The result is an underwater audio system that can deliver high fidelity while exposed to underwater pressures. In some embodiments, the electronic device is a standard consumer electronic audio device, such as an MP3 player, that produces an audio signal of suitable power for speaker elements generating sound in air but inadequate signal power for speaker elements generating sound under water.

In some embodiments, the amplifier can amplify one or more audio channels. For example, the amplifier may amplify two audio channels, thus providing amplification for a stereo electronic audio device. In some embodiments, the amplifier can drive speaker elements at frequencies between 20 Hz and 25 kHz.

In some embodiments, the amplifier is powered by a portable power source such as a battery. In one embodiment, the power source for the amplifier is the same power source that powers the electronic device. In another embodiment, the power source for the amplifier is separate from the power source used by the electronic device.

In some embodiments, the amplifier is small in size to help provide better ergonomics of an underwater audio system. It is also advantageous that the amplifier be small in size so as to reduce heat dissipation by the amplifier.

In some embodiments, the amplifier contains an input audio port for receiving audio signals from an electronic device. In some embodiments, the input audio port facilitates electrical connection between the electronic device and the amplifier. In one embodiment, the input audio port is a stereo jack for receiving stereo audio signals from the electronic device. In one embodiment, standard stereo jack components are used such that the amplifier can be plugged into a standard output or headphone jack provided by a consumer electronic audio device. In some embodiments, the input audio port is wired directly to the electronic device. In some embodiments, the input audio port provides for wireless reception of audio signals transmitted by the electronic device. In these embodiments, transmitter electronics electrically connected to the electronic device are provided for transmitting the audio signal from the electronic device and receiver electronics are electronically connected to the amplifier for receiving the audio signal. The electronic circuitry for wirelessly transmitting and receiving audio signals may be designed by any of the methods known to those skilled in the art and may include technology for buffering data into memory to help provide a consistent data stream.

In some embodiments, the amplifier contains one or more output ports that facilitate electrical connection to one or more speaker elements. The one or more output ports may consist of one or more audio jacks. For example, a stereo output jack may be provided. In some embodiments, the physical outputs may be wired directly to the speaker elements instead of providing an output jack.

The speaker elements may comprise any of the element designs disclosed above. For example, the speaker elements may comprise piezo-electric, bone conduction, or transducer elements. As previously discussed, the speaker elements may be disposed in one or more waterproof housings. In one embodiment, the waterproof housings that contain the speaker elements may be oil filled to help withstand underwater pressure.

In some embodiments the amplifier has a component for powering the amplifier on and off. In one embodiment, the component is a button. In another embodiment, the component is a switch. In other embodiments, the amplifier automatically powers on when an input audio signal is provided. In another embodiment, the amplifier may be pressure sensitive and turn on and off based on external pressure. The electronic circuitry for automatically powering the amplifier on upon detecting an input audio signal may be designed by any of the methods known to those skilled in the art.

In some embodiments the amplifier contains a power indicator for indicating whether the amplifier is powered on or off. In one embodiment, the power indicator is a light. In a specific embodiment, the light is an LED. An LED is advantageous because of its relatively low power consumption.

Figure 13A:
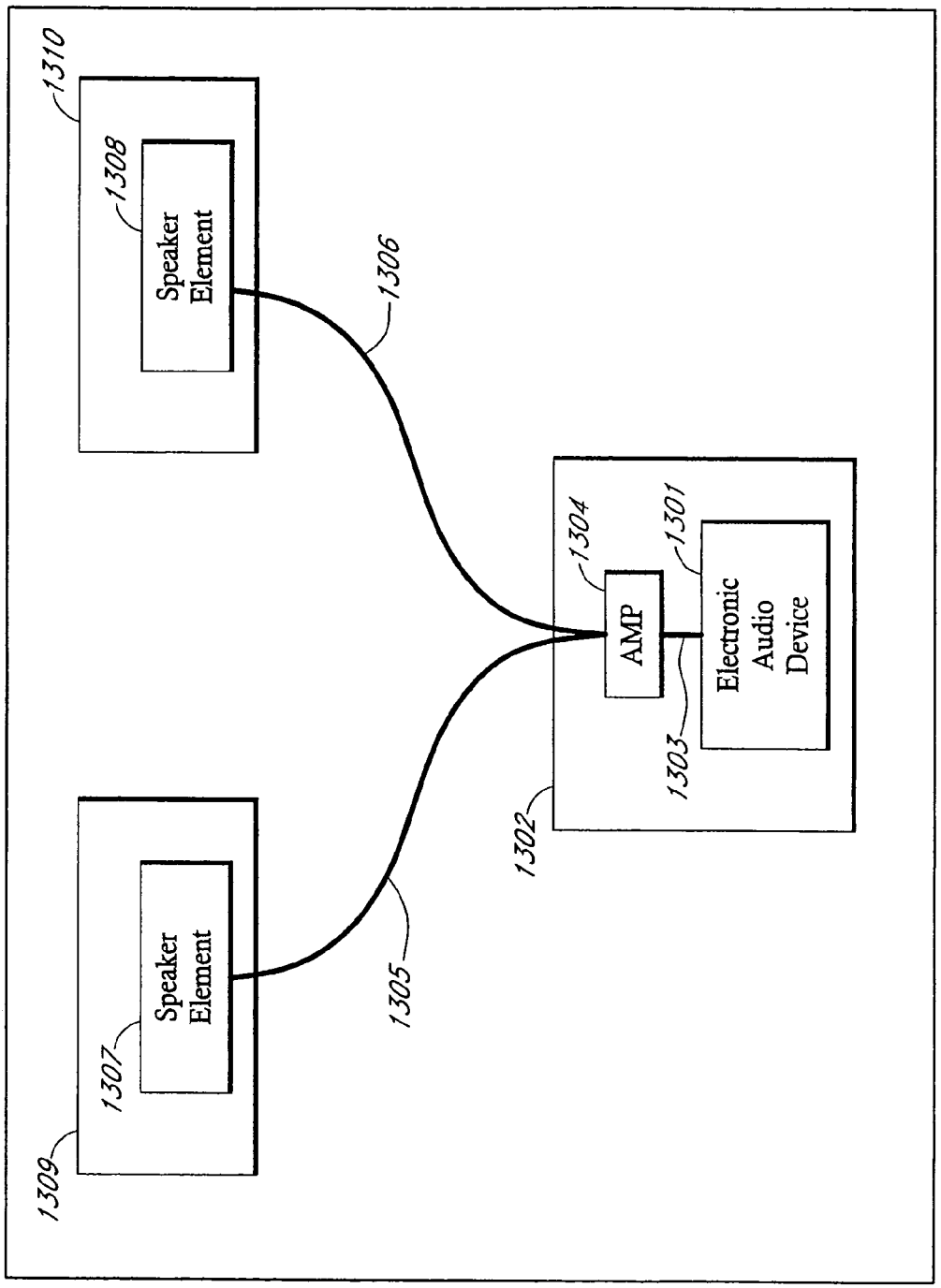
FIG. 13A illustrates an audio system with an amplifier disposed in the electronic audio device housing.

In some embodiments, the amplifier may be disposed in the same waterproof housing that contains the electronic device. The waterproof housing is discussed above. As illustrated in FIG. 13A, an electronic device capable of producing an audio signal 1301 is electronically connected via electrical connection 1303 to the amplifier 1304. The electrical connection 1303 may consist of any means of electrically transmitting an audio signal from the electronic device 1301 to the amplifier 1304. For example, it may consist of one or more wires and may include one or more jacks and/or plugs for facilitating connection. The amplifier 1304 and electronic device 1301 are disposed within waterproof and pressure resistant housing 1302.

Figure 13B:
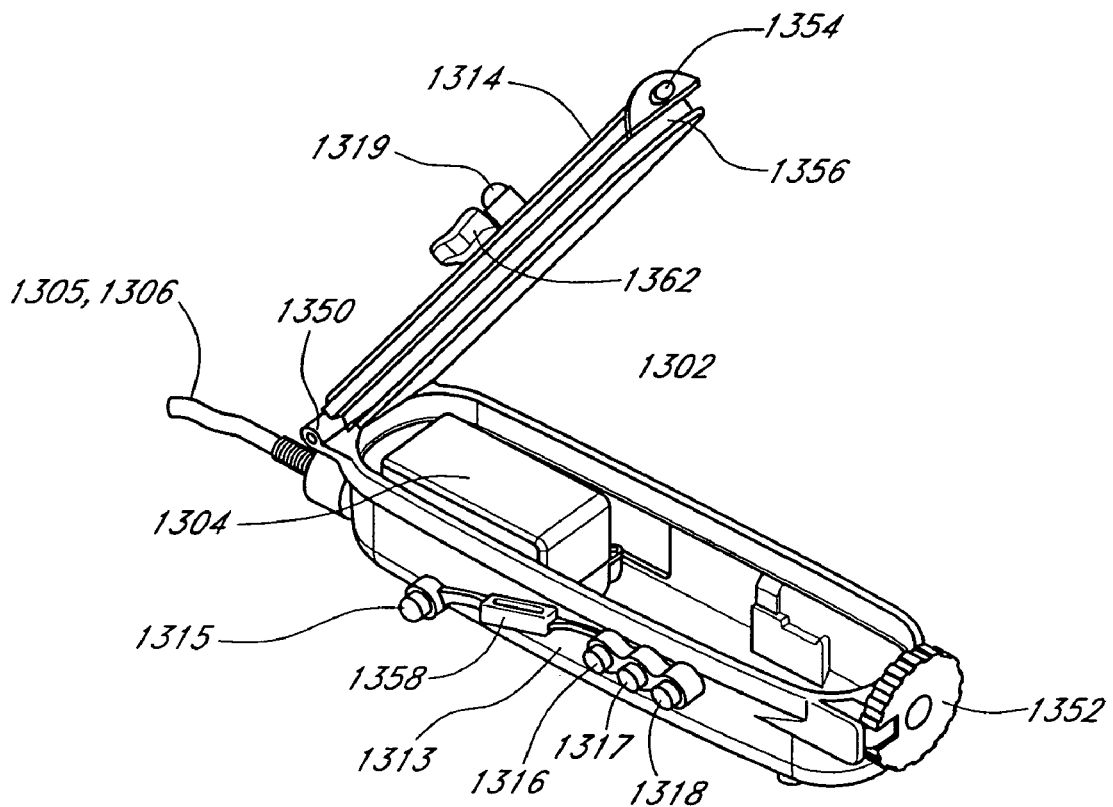
FIG. 13B illustrates an amplifier disposed in the electronic audio device housing.
Figure 13C:
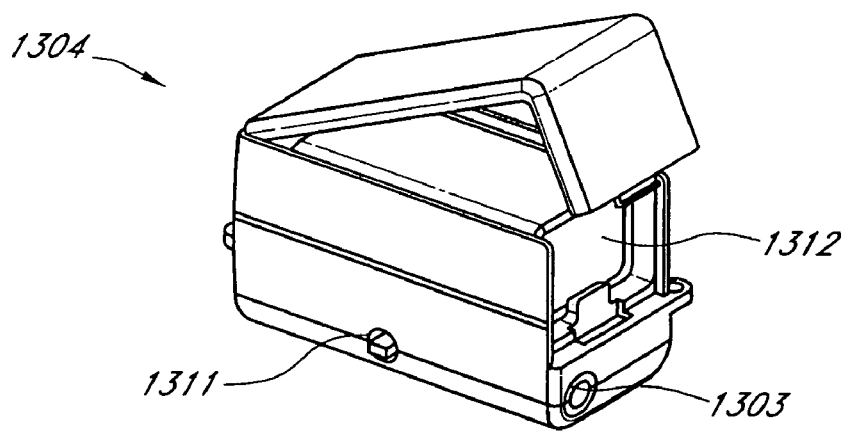
FIG. 13C illustrates an amplifier.

FIG. 13B illustrates one embodiment comprising a waterproof housing 1302 containing an amplifier 1304 and a space adapted to receive an electronic audio device 1301. The waterproof housing 1302 features a base 1313 and a lid 1314. FIG. 13C shows the amplifier 1304 for use in the housing 1302 featuring a pushbutton or switch 1311 for turning the amplifier on and/or off. The amplifier 1304 may include jack 1303 for electrical connection to the electronic audio device 1301. The amplifier may also comprise its own power source, such as battery 1312. In some embodiments, the housing 1302 is equipped with a push-button or switch 1315 that facilitates turning the amplifier on and/or off by interfacing with the amplifier pushbutton or switch 1311. This button or switch can be manufactured such that it can be turned on or off without having to open housing 1302. In some embodiments, amplifier 1304 has an on/off indicator such as a light that can be viewed through housing 1302 without having to open it.

The amplifier 1304 is electrically connected via audio communication links 1305 and 1306 to speaker elements 1307 and 1308. The audio communication links 1305 and 1306 may be as described earlier and may comprise a waterproof and pressure resistant cable. The cable may be connected to an audio jack, such as the stereo jack described earlier, which can plug into an audio jack adapter in the side of the housing 1302 to facilitate electrical connection between the cable and the amplifier. As described earlier, components may be provided to facilitate a waterproof and pressure resistant connection between the audio jack and the audio jack adapter. Alternatively, audio communication links 1305 and 1306 may be permanently connected to electronic device 1301. In such cases, communication links 1305 and 1306 may enter housing 1302 at the same location, sharing the same seal, or they may enter housing 1302 in separate locations. Alternatively, a single communication link may enter housing 1302. In such a case, the single communication link branches into communication links 1305 and 1306 outside of housing 1302.

Speaker elements 1307 and 1308 are disposed within their own individual waterproof and pressure resistant housings 1309 and 1310. These housings may be designed as described earlier. Electrical connection between the audio communication links 1305 and 1306 and the speaker elements 1307 and 1308 may be facilitated by audio jack and audio jack adapter components as described above. Alternatively, the audio communication links 1305 and 1306 may consist of cables permanently connected to the speaker elements 1307 and 1308. In that case, a watertight and pressure resistant seal is formed where the cables enter the housings 1309 and 1310 to prevent leakage into the housings 1309 and 1310.

Figure 14:
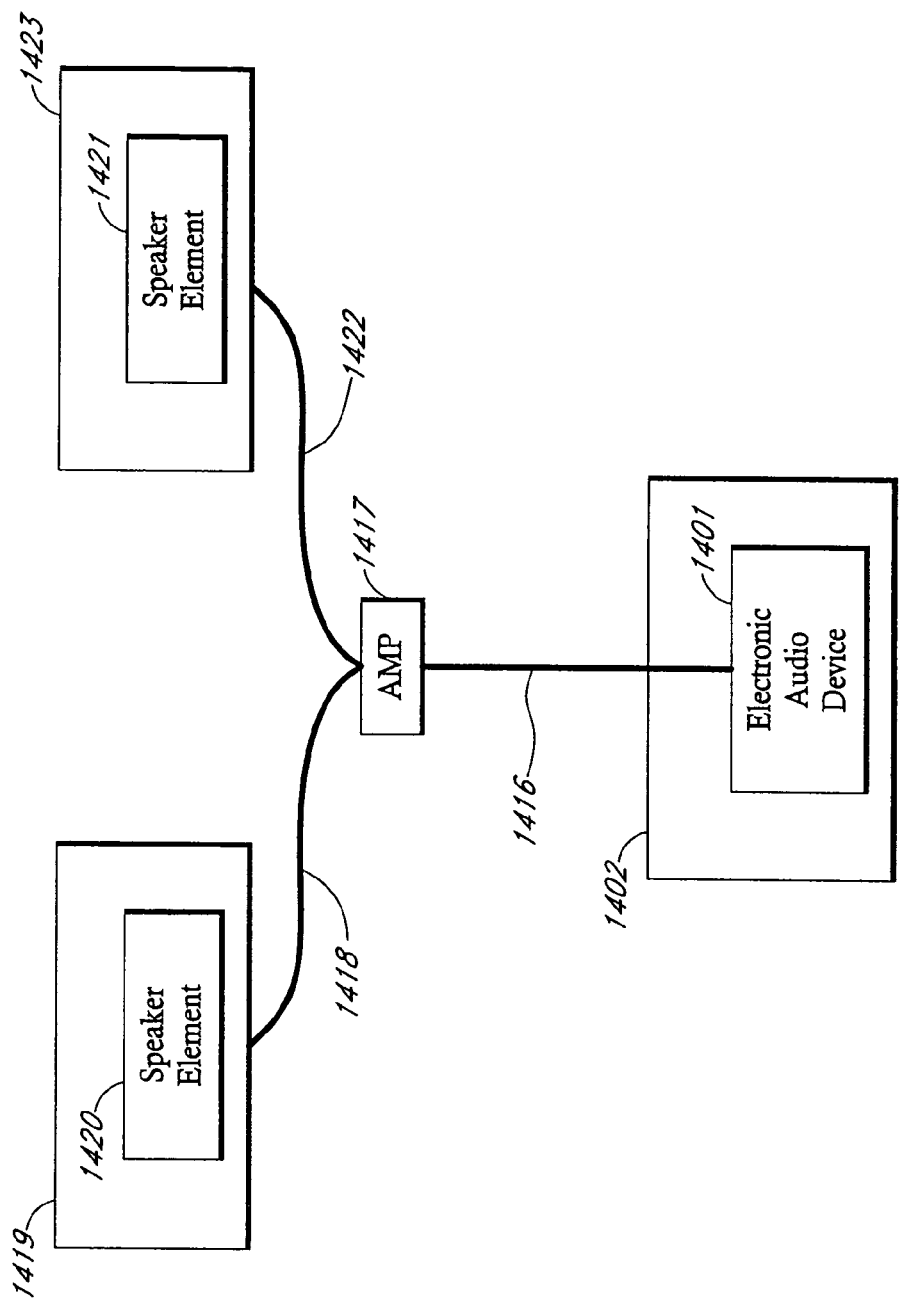
FIG. 14 illustrates an audio system with an amplifier disposed in a separate housing.

In some embodiments, the amplifier may be disposed in a waterproof and pressure resistant housing separate from the housing that contains the electronic device. One such embodiment is illustrated in FIG. 14. The electronic device 1401 is contained within housing 1402. The amplifier is contained within housing 1417. An electrical connection between the electronic device 1401 and the amplifier is via audio communication link 1416. A power source, such as a battery, may be provided in housing 1417 to provide power for the amplifier. Alternatively, power may be provided to the amplifier from a power source in housing 1402. In such a case, an electrical power connection is provided between the power source and the amplifiers. In some embodiments, the electrical power connection may share a waterproof and pressure resistant cable with the audio communication link 1416. It will be appreciated that power may be provided to the amplifier using any power source consistent with the amplifier's intended use.

Audio communication link 1416 may consist of a waterproof and pressure resistant cable or other audio communication means. In some embodiments, the electrical connection between electronic device 1401 and audio communication link 1416 is permanent. In these embodiments, a watertight and pressure resistant seal is formed where audio communication link 1416 enters the side of housing 1402. In other embodiments, one or more jacks and/or plugs are provided in the side of housing 1402 to facilitate electrical connection between the electronic device 1401 and the audio communication link 1416. These jacks and plugs may be as described earlier.

Audio communication link 1416 is electronically connected to the amplifier. In some embodiments, the electronic connection is permanent. In these embodiments, a watertight and pressure resistant seal may be formed where audio communication link 1416 enters the side of housing 1417. In other embodiments, one or more jacks and/or plugs are provided in the side of housing 1402 to facilitate electrical connection between the electronic device 1401 and the audio communication link 1416. These jacks and plugs may be as described earlier.

Audio communication links 1418 and 1422 are provided to facilitate electrical connection between the amplifier and speaker elements 1420 and 1421. Audio communication links 1418 and 1422 may comprise waterproof and pressure resistant cables. In some embodiments, electronic connection between audio communication links 1418 and 1422 are permanent. In these embodiments, a watertight and pressure resistant seal may be formed where audio communication links 1418 and 1422 enter the side of housing 1417. Audio communication links 1418 and 1422 may enter housing 1417 at the same location, sharing the same seal, or the may enter housing 1417 in separate locations. Alternatively, a single communication link may enter housing 1417. In such a case, the single communication link branches into communication links 1418 and 1422 outside of housing 1417. In other embodiments, one or more jacks and/or plugs are provided in the side of housing 1402 to facilitate electrical connection between the amplifier and the audio communication links 1418 and 1422. These jacks and plugs may be as described earlier.

In some embodiments, audio communication links 1416, 1418, and 1422 along with the amplifier and housing 1417 may be provided together as an audio communication link between the electronic device 1401 and speaker elements 1420 and 1421.

Speaker elements 1420 and 1421 are disposed within housings 1419 and 1423. These housings may be as described above. In some embodiments, the electronic connection between audio communication links 1418 and 1422 and speaker elements 1420 and 1421 are permanent. In these embodiments, a watertight and pressure resistant seal may be formed where audio communication links 1418 and 1422 enter the side of housings 1419 and 1423. In other embodiments, one or more jacks and/or plugs are provided in the side of housings 1419 and 1423 to facilitate electrical connection between the amplifier and the speaker elements 1420 and 1421. These jacks and plugs may be as described earlier.

Figure 15:
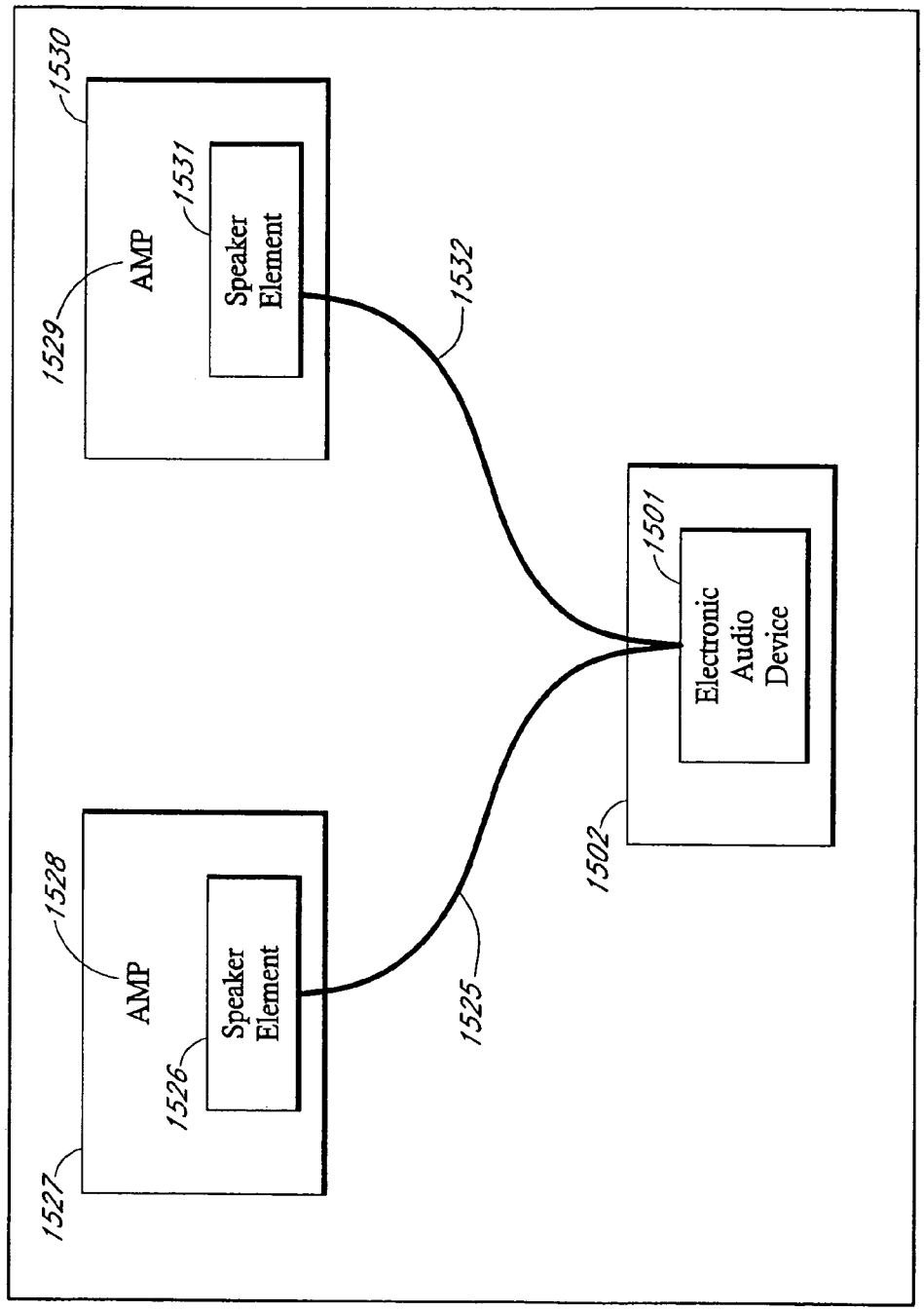
FIG. 15 illustrates an audio system with amplifiers disposed in speaker housings along with speaker elements.

In some embodiments, one or more amplifiers are disposed within the same housings as the speaker elements. As illustrated in FIG. 15, electronic device 1501 is contained within housing 1502. Speaker elements 1526 and 1531 and amplifiers 1528 and 1529 are disposed within speaker housings 1527 and 1530 respectively. Audio communication links 1525 and 1532 provide an electronic connection between electronic device 1501 and the amplifiers 1528 and 1529. As described above, communication links 1525 and 1532 may be permanently connected to audio device 1501 and amplifiers 1528 and 1529. In such cases, watertight and pressure resistant seals may be provided where communication links 1525 and 1532 enter housings 1502, 1527 and 1530. Audio communication links 1525 and 1532 may enter housing 1502 at the same location, sharing the same seal, or they may enter housing 1502 in separate locations. Alternatively, a single communication link may enter housing 1502. In such a case, the single communication link branches into communication links 1525 and 1532 outside of housing 1502. Also as described above, in some embodiments one or more jacks and/or plugs are provided in the side of housings 1502, 1527, and 1530 to facilitate electrical connection between the amplifier and the amplifiers 1529 and 1529. These jacks and plugs may be as described earlier.

Amplifiers 1528 and 1529 are electrically connected to speaker elements 1526 and 1531 within housings 1527 and 1530. Audio signals provided by electronic device 1501 are amplified separately for each speaker element 1526 and 1531 by amplifiers 1528 and 1529 respectively. A power source, such as a battery, may be provided in each speaker housing 1527 and 1530 to provide power for amplifiers 1528 and 1529. Alternatively, power may be provided to amplifiers 1528 and 1529 from a power source in housing 1502. In such a case, electrical power connections are provided between the power source and the amplifiers 1528 and 1529. In some embodiments, the electrical power connection may share a waterproof and pressure resistant cable with audio communication links 1525 and 1532. It will be appreciated that power may be provided to the amplifier using any power source consistent with the amplifier's intended use.

Figure 16:
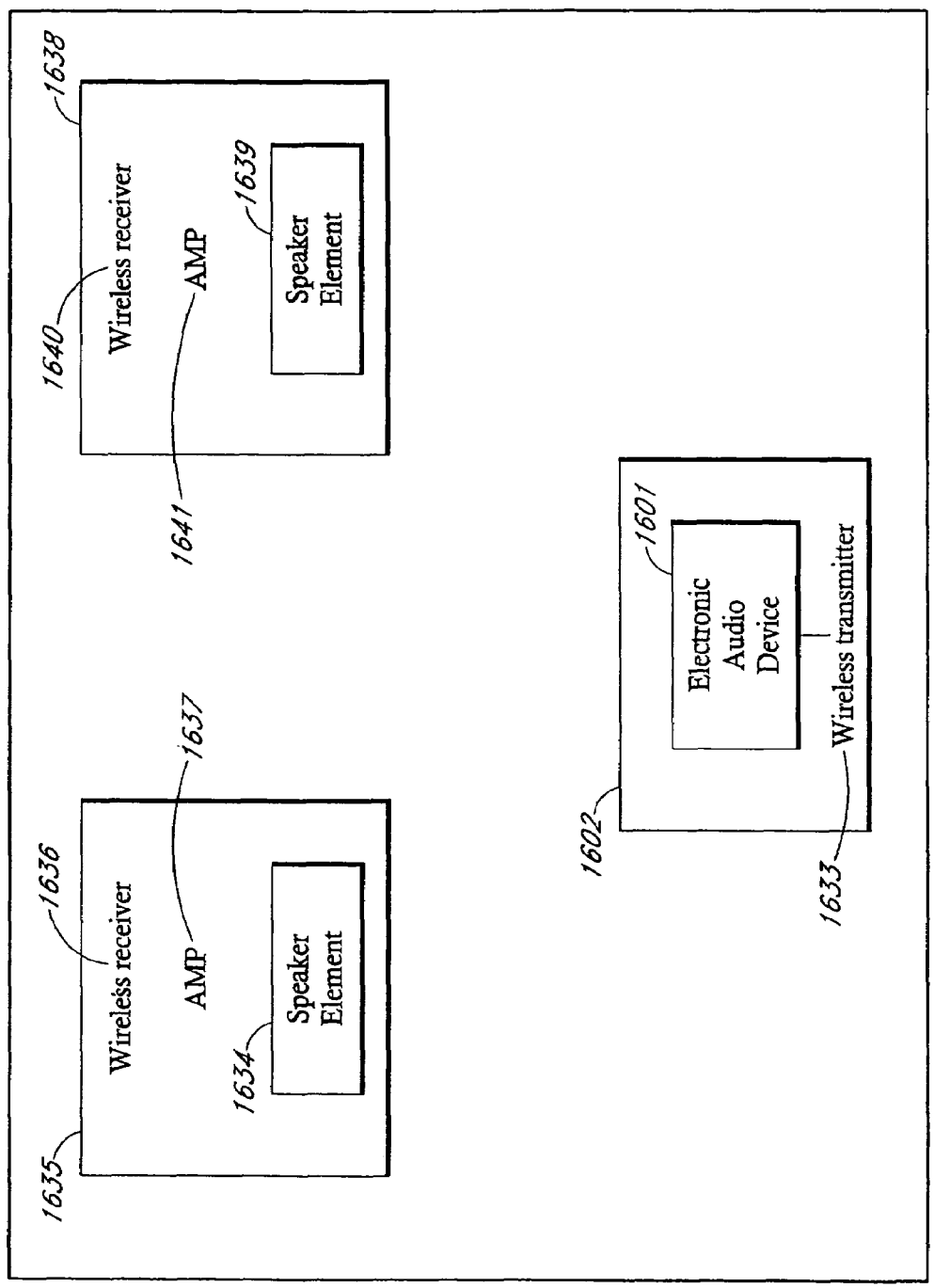
FIG. 16 illustrates an audio system with amplifiers disposed in speaker housings along with speaker elements and wireless receivers for receiving audio signals from a wireless transmitter disposed in a housing along with an electronic audio device.

In some embodiments, illustrated in FIG. 16, a wireless communication link is provided. As described above, amplifiers 1637 and 1641 may be disposed in the same housings 1635 and 1638 as speaker elements 1634 and 1639. In addition, wireless receivers 1636 and 1640 are also disposed within speaker housings 1635 and 1638. The wireless receivers 1636 and 1640 are electrically connected to amplifiers 1637 and 1641, which in turn are electrically connected to speaker elements 1634 and 1639. A power source, such as a battery, is also provided within speaker housings 1635 and 1638 to provide power for receivers 1636 and 1640 and amplifiers 1637 and 1641. A wireless transmitter 1633 that is disposed along with the electronic device 1601 within housing 1602 transmits an audio signal to receivers 1636 and 1640. The wireless transmitter 1633 is electrically connected to electronic device 1601 within the housing 1602. Transmitter 1633 is powered by a power source, such as a battery, located within housing 1633. In some embodiments, the transmitter 1633 shares a power source with the electronic device 1601. In other embodiments, the transmitter 1633 has its own power source.

Figure 17:
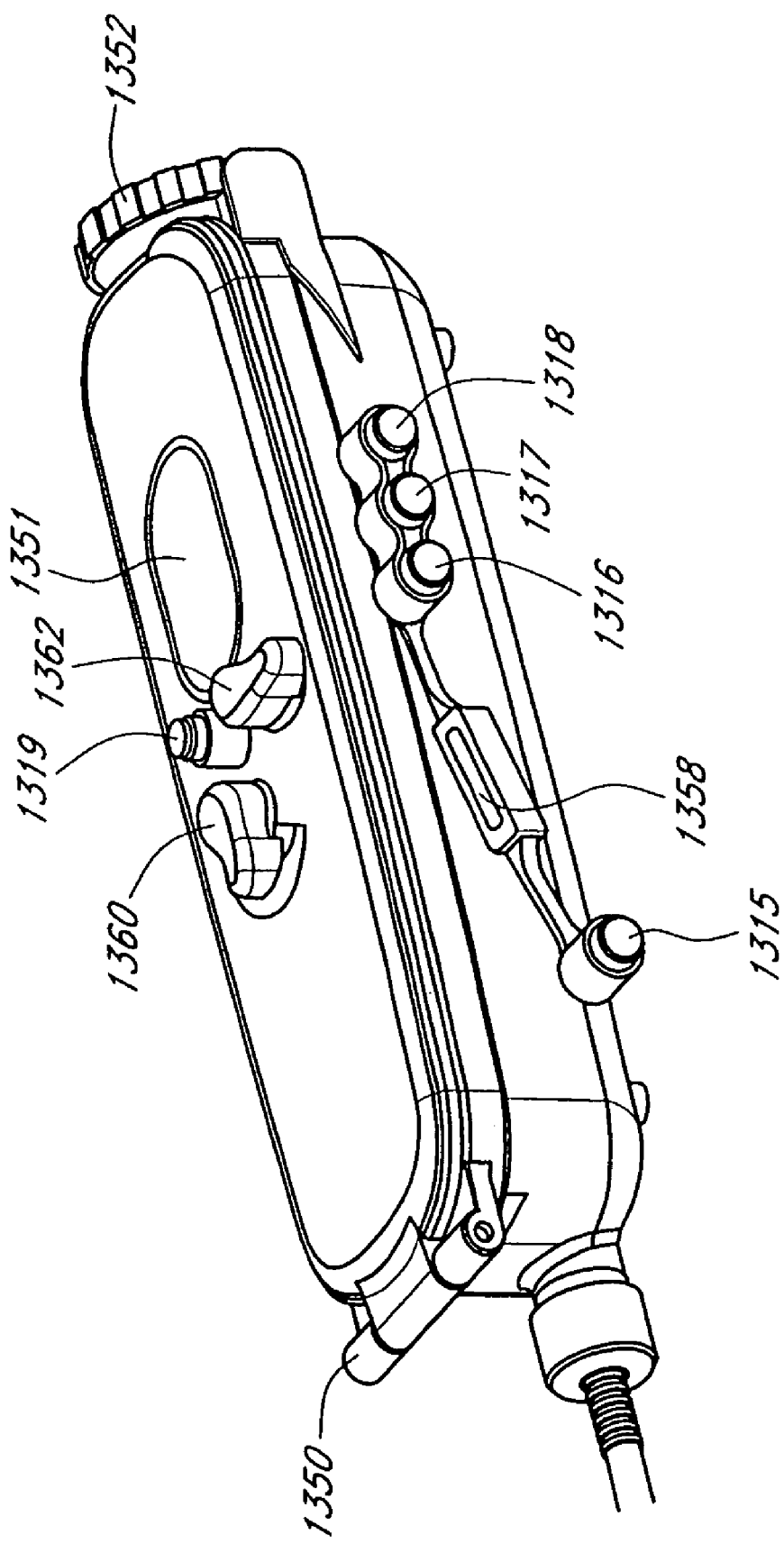
FIG. 17 illustrates a perspective view of a housing with the lid closed.
Figure 18A:
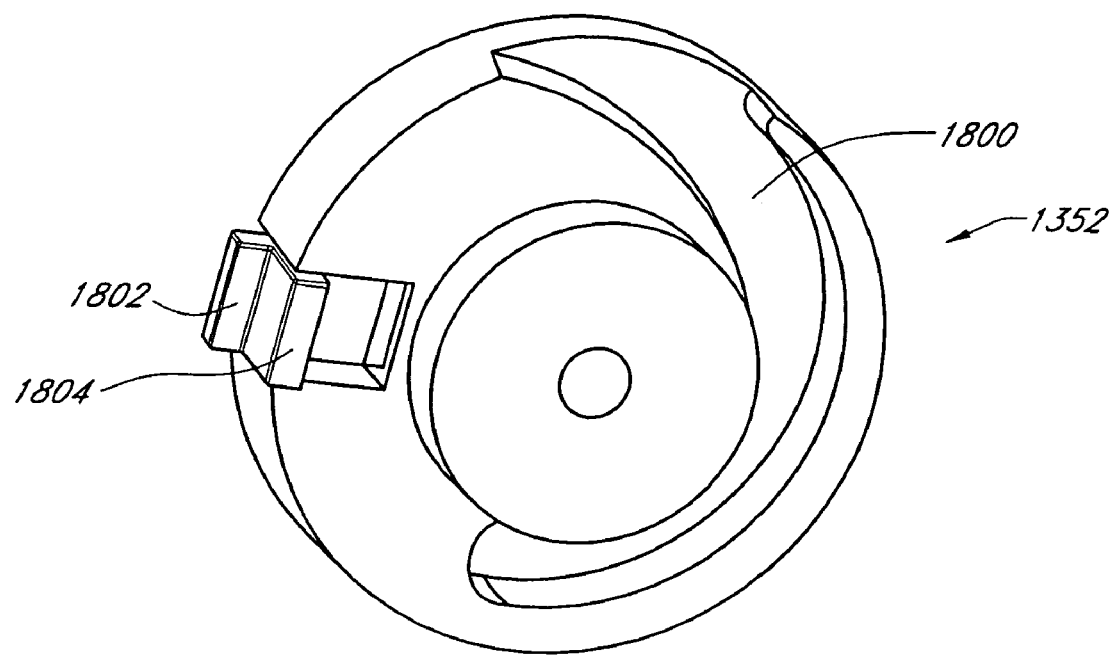
FIGS. 18A and 18B illustrates a cam wheel for securing a lid shut.
Figure 18B:
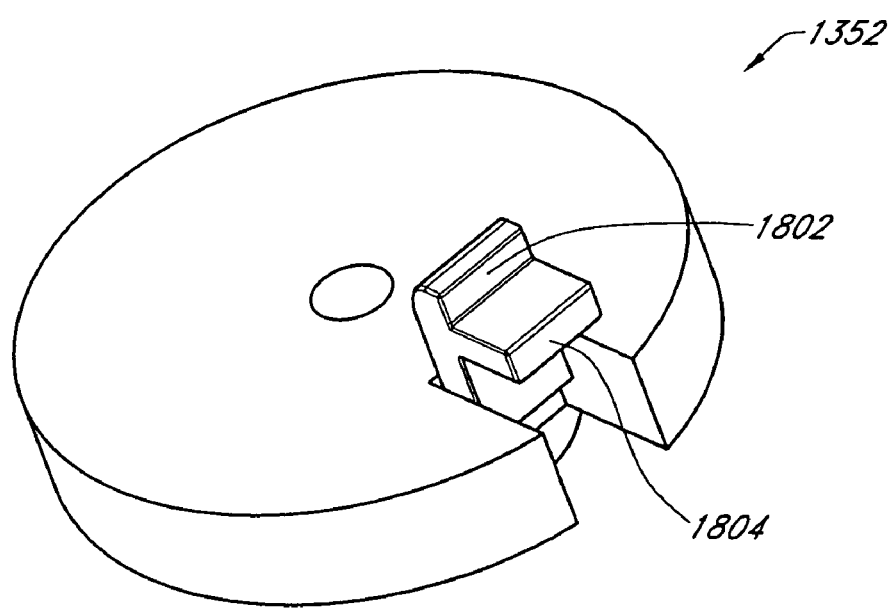

In one embodiment, a waterproof housing 1302 as depicted in FIG. 13B is used to house an electronic audio device and/or an amplifier 1304. As discussed above, housing 1302 comprises a base 1313 and a lid 1314. In some embodiments, the base and lid may be made out of plastic, including translucent or semi-translucent plastic which optionally may be color tinted. The lid may be secured to the base by hinge 1350, which allows the lid 1314 to be open as depicted in FIG. 13B, or closed as depicted in FIG. 17. The lid may comprise a window 1351, which increases visibility of displays on an electronic audio device disposed within housing 1302. Window 1351 may be made out of translucent plastic or other material that is more translucent that the rest of housing 1302. In some embodiments, window 1351 is recessed so that it is closer to the display on the electronic audio device. In some embodiments, window 1351 is made lens-like so as to provide magnification of the display. Those of skill in the art will recognize multiple techniques for creating a lens-like window, such as by forming concave and/or convex surfaces on the window or by utilizing flat lens technology. The lid 1314 may be locked into the closed position by cam dial 1352. As depicted in FIG. 18A, cam dial 1352 contains groove 1800. When lid 1314 is closed, projection 1354 on lid 1314 (depicted in FIG. 13B) interfaces with groove 1800. Cam dial 1352 may then be rotated such that projection 1354 slides through groove 1800, thereby increasing downward pressure on lid 1314. Lid 1314 contains o-ring 1356 for creating a waterproof seal between base 1313 and lid 1314 when cam dial 1352 creates downward pressure on lid 1314. With reference to FIGS. 18A and 18B, Cam dial 1352 may also comprise tab 1802 for locking cam dial 1352 in place. Tab 1802 contains a projection 1804 that interfaces with a slot in base 1313 and prevents cam dial 1352 from rotating. To allow rotation of cam dial 1352, tab 1802 may be swung to an up position as depicted in FIG. 18B. In this position, projection 1804 no longer interfaces with the slot in base 1313, allowing the cam dial 1352 to rotate for locking or unlocking the lid 1314 to base 1313.

With reference to FIGS. 13B and 17, housing 1302 may contain several control devices, including buttons 1315, 1316, 1317, 1318, and 1319 and levers 1360 and 1362. As discussed above, button 1315 may interface with button 1311 on amplifier 1304 for turning the amplifier on and/or off. Buttons 1316, 1317, 1318, and 1319 and levers 1360 and 1362 may interface with control devices on an electronic audio device for controlling the audio device when the lid 1314 is closed. In one embodiment, the control devices in housing 1302 are designed to interface with the control devices on an iRiver 300 series MP3 player. The housing 1302 may also contain a slot 1358 for securing a strap to the housing. The strap may then be secured to an individual.

Figure 19A:
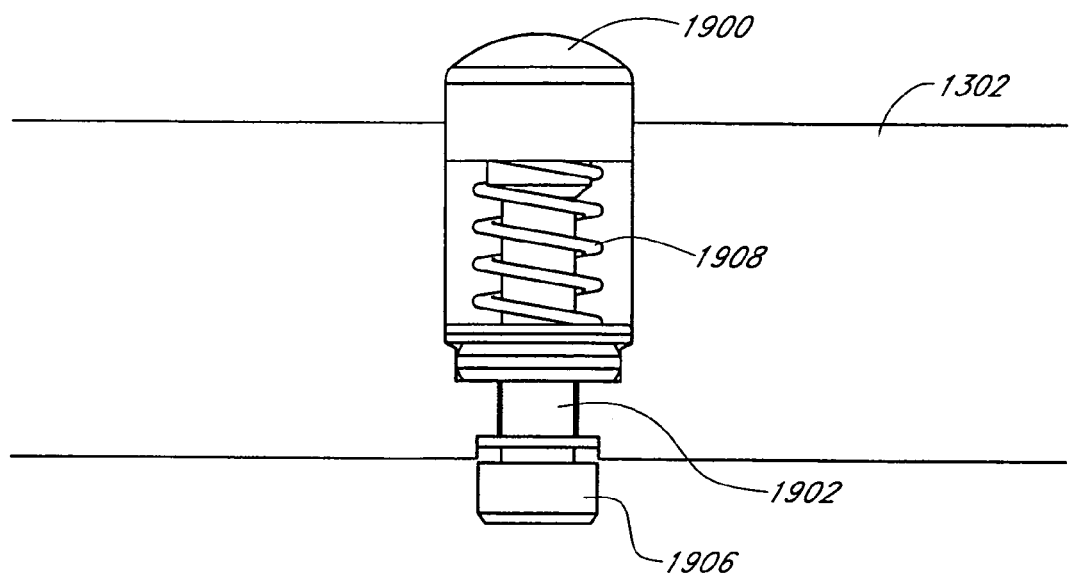
FIG. 19A illustrates a button control on a housing.
Figure 19B:
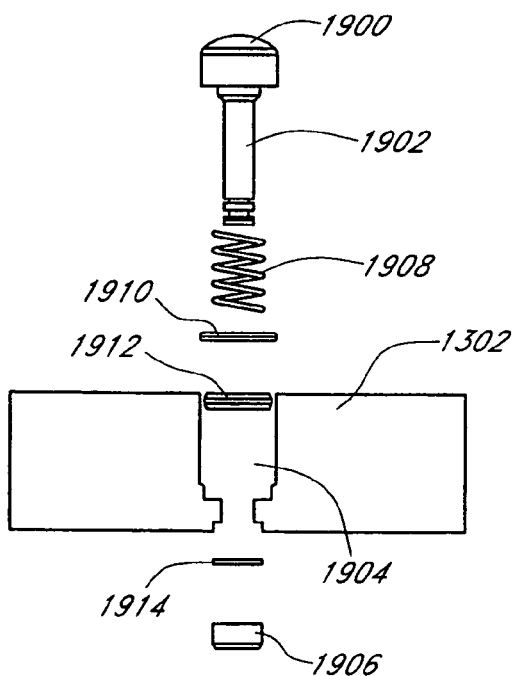
FIG. 19B illustrates an exploded view of a button.

Buttons 1315, 1316, 1317, 1318, and 1319 are depicted in FIGS. 19A and 19B. The buttons may comprise finger pad 1900 on the exterior of housing 1302 for manual pressing of the button. Rigid piston 1902 extends through a cavity 1904 in the side of housing 1302 to the interior of the housing 1302. Button manipulator 1906 may be connected to piston 1902 on the interior of the housing 1302 for making contact with and manipulating buttons on the electronic audio device and/or amplifier. Spring 1908 may be provided for keeping the button raised when not being pressed. Spring 1908 may have a spring constant sufficient for resisting activation of the button when exposed to underwater pressure. Snap ring 1914 may be provided for preventing button 1900 from exiting housing 1302 through cavity 1904. O-ring 1912 prevents water from entering housing 1302 along piston 1902 or through cavity 1904. Washer 1910 provides a platform for spring 1908 to transfer load to housing 1302 while protecting o-ring 1912.

Figure 20A:
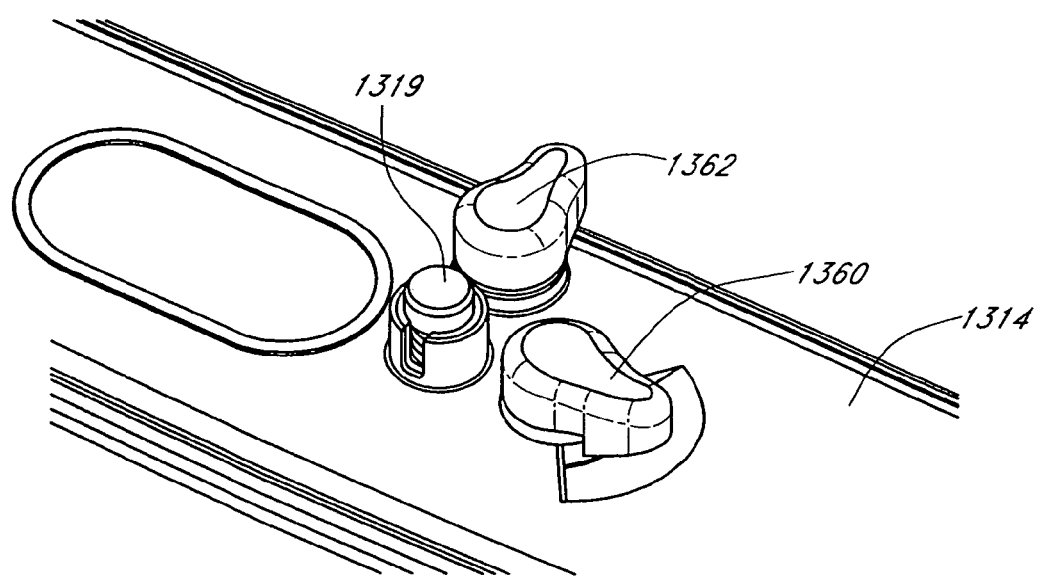
FIG. 20A illustrates lever controls on the exterior of a housing.
Figure 20B:
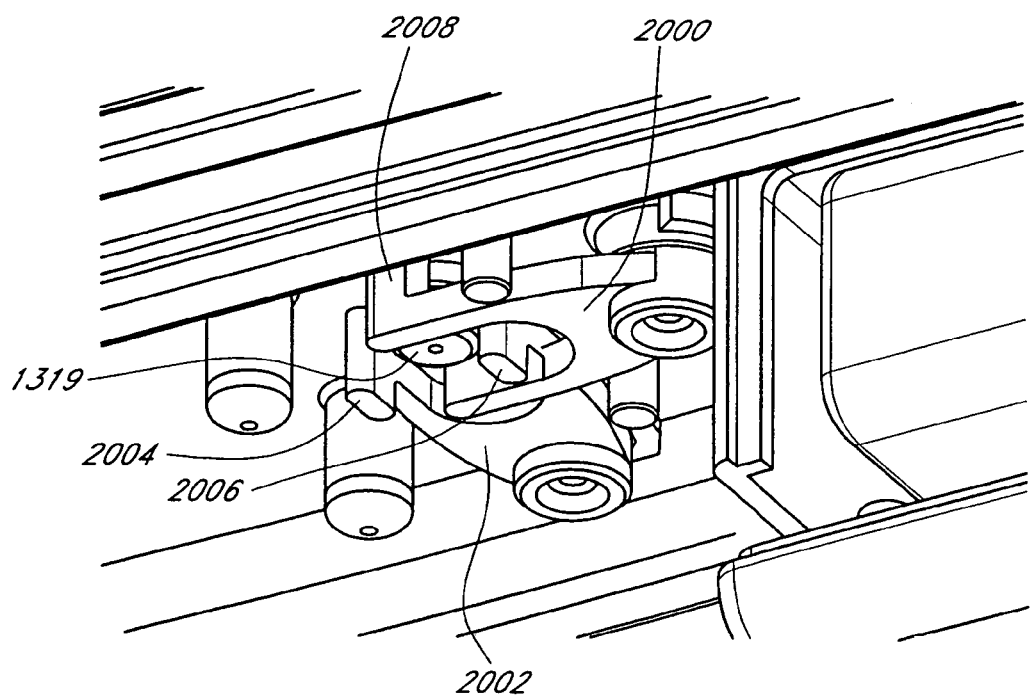
FIG. 20B illustrates interior mechanisms for controlling a joystick on an electronic audio device.

Control levers 1360 and 1362 are depicted in more detail in FIGS. 20A and 20B. Control levers 1360 and 1362 may be used to manipulate a joystick control located on an electronic audio device. Rigid portions extend from control levers 1360 and 1362 through lid 1314 and into the interior of the housing 1302. The rigid portions are interfaced to fork structures 2000 and 2002. Manipulation of control levers 1360 or 1362 results in rotation of fork structures 2000 and 2002 respectively. Fork structures 2000 and 2002 may be constructed such that they overlap but may still freely move without being impeded by each other. For example, as depicted in FIG. 20B, the portion of fork structure 2000 that overlaps with fork structure 2002 may be below fork structure 2002 to avoid interference. Fork structures 2000 and 2002 may comprise tabs 2004, 2006, and 2008 for manipulating a joystick. For example, manipulation of lever 1362 would rotate fork structure 2002, resulting in tabs 2004 or 2006 moving the joystick in a sideways direction. Similarly, manipulation of lever 1360 would rotate fork structure 2000, resulting in tabs moving the joystick in an up-and-down direction. In some embodiments, the joystick may also be pressed vertically down using button 1319, which may be positioned directly above the joystick. Thus, by using control levers 1360 and 1362 and button 1319, a joystick may be manipulated sideways (e.g., along on an x-axis), up and down (e.g., along a y axis), and vertically (e.g., along a z axis).

Figure 21A:
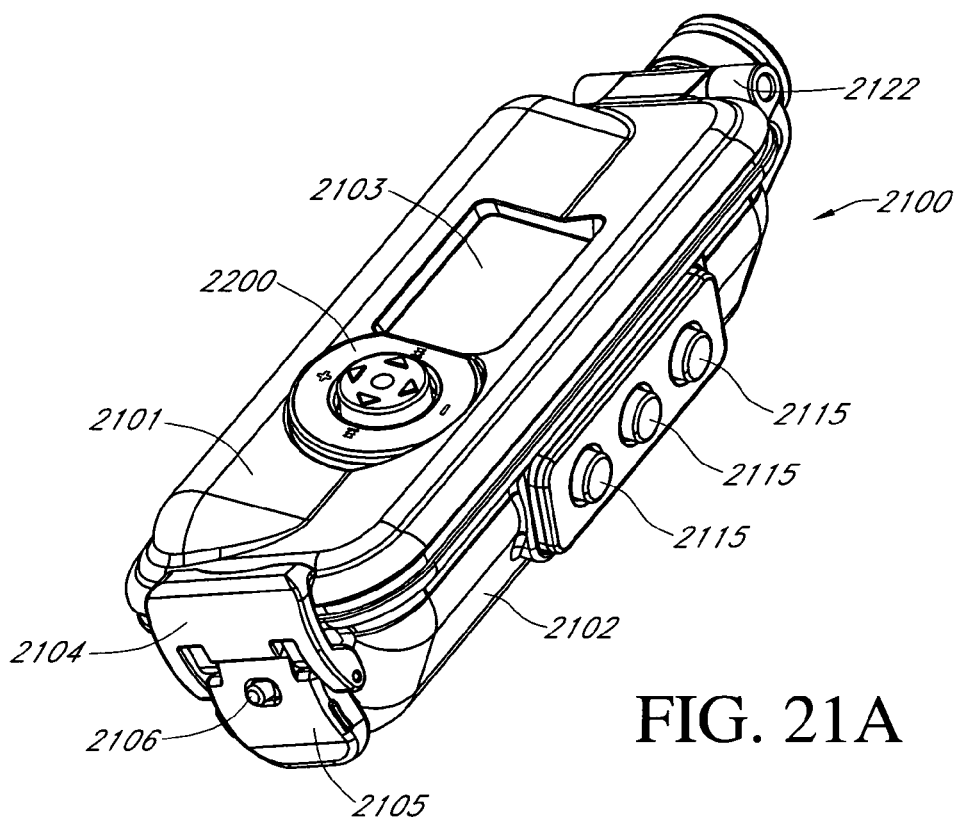
FIG. 21A is a perspective view of a closed waterproof housing with button and joystick controls.
Figure 21B:
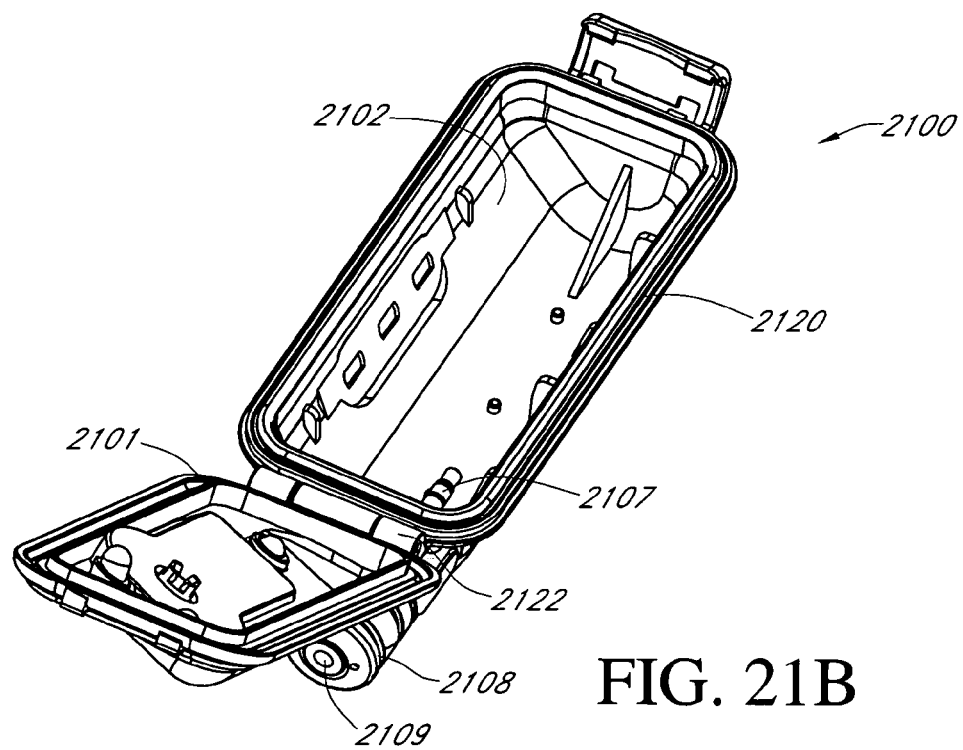
FIG. 21B is a perspective view of an open waterproof housing with button and joystick controls.

Another embodiment of a waterproof housing 2100 for holding an electronic audio device is depicted in FIGS. 21A and 21B. FIG. 21A depicts the housing 2100 in the closed configuration and FIG. 21B depicts the housing 2100 in an open configuration. Housing 2100 comprises a lid 2101 and a base 2102. A waterproof seal 2120 is provided between the lid 2101 and the base 2102. Housing 2100 includes controls in both the lid 2101 of the housing 2100 and in the base 2102 of the housing that allow a user to control an electronic audio device positioned within the housing 2100. The controls include a joystick interface assembly 2200 for controlling a joystick feature on the electronic audio device and buttons 2115 for controlling push buttons on the electronic audio device. Lid 2101 features a substantially transparent window section 2103 where the display of the electronic audio device disposed within can be observed. Lid 2101 and base 2102 are attached via a hinge 2122. Base 2102 and lid 2101 may be secured together to form a waterproof seal using a latch made up of an upper latch 2104 and a lower latch 2105 that feature a locking mechanism 2106. The inside of the housing features a male audio jack 2107 that is electrically connected to a female audio communication link 2109. The female audio communication link 2109 is surrounded by a fastener 2108 that may be used to create a waterproof seal around the communication link 2109. For example, earphones or speakers may be provided having a male plug surrounded by a flexible skirt. The skirt may be secured around the fastener 2108 when the male plug is plugged into the communication link 2109 such that a connection free of water ingress is created. Those of skill in the art will recognize that multiple ways to create a seal around the audio communication link exist, such as internal sealing, male and female coupling, gaskets, and co-molding techniques.

Figure 22A:
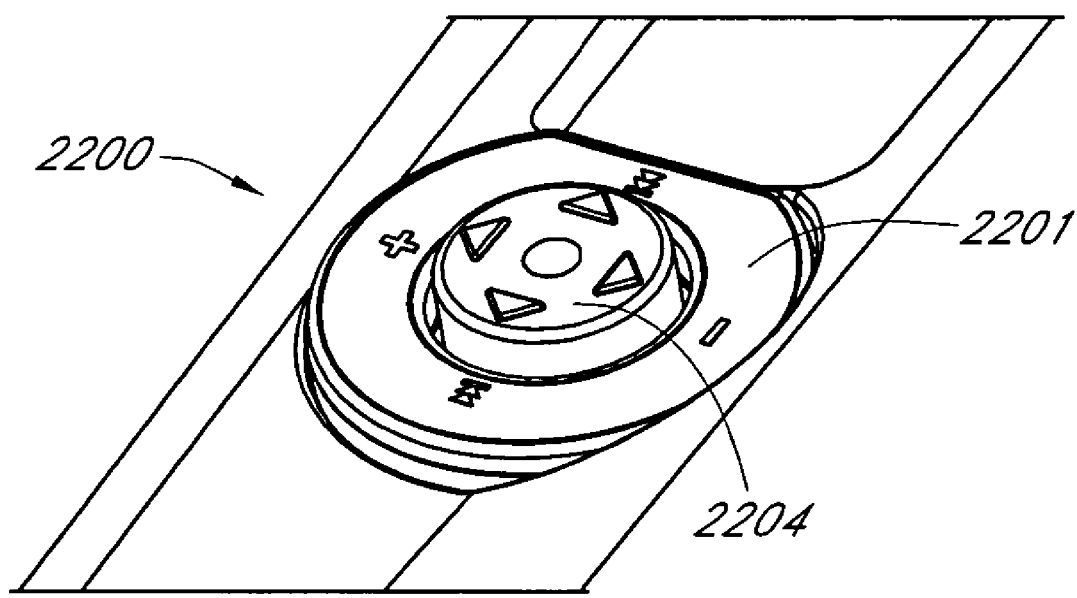
FIG. 22A is a perspective view of a joystick control.
Figure 22B:
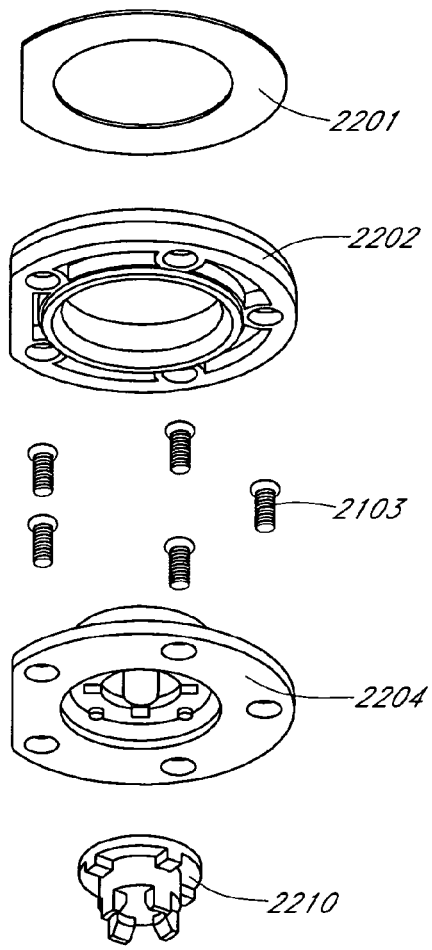
FIG. 22B is an exploded view of a joystick control.
Figure 22C:
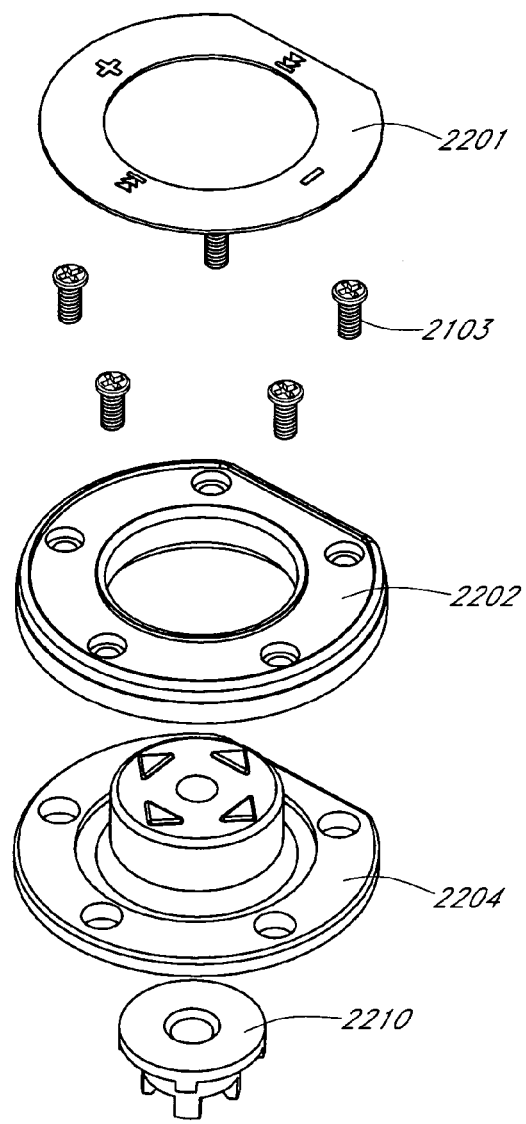
FIG. 22C is another exploded view of a joystick control.

The joystick interface assembly 2200 is shown in greater detail in FIGS. 22A, 22B, and 22C. FIG. 22A shows the joystick interface assembled into the housing, complete with a function pad 2204 and a decoration sheet 2201 to indicate which direction the control interface may be moved to get the desired effect of the electronic device. FIGS. 22B and 22C shows exploded views of the joystick interface assembly 2200. The decoration sheet 2201 covers clamping piece 2202, which is held into the housing lid 2101 using fasteners 2103. One skilled the art would recognize many different methods of fastening a control feature into the housing, such as, but not limited to, screw, bolts, snap fit components, adhesives, press fits, co-molded components, overmolded components, ultrasonically welded components, rotational fits, wedge fits, and other manufacturing means of effecting the assembly of components. The clamping piece forces the function pad 2204 against the housing lid 2101. The function pad may be made of a flexible waterproof material such as silicone rubber. Thus, the function pad 2204 may also serve the function of creating a waterproof seal about the control opening in the lid 2101. Those of skill in the art will recognize that many different materials could be used to create a waterproof seal between the function pad 2204 and the opening in the housing lid 2101. The material and design geometry chosen provides not only a waterproof seal, but also an elasticity that allows manipulations of the electronic audio device, and enough rigidity to return to a neutral position after each use. A joystick contact device 2210 is provided for contacting the top of a joystick on the electronic audio device. When a user manipulates the function pad 2204, the joystick contact device 2210 will push the joystick in the desired direction.

Figure 22D:
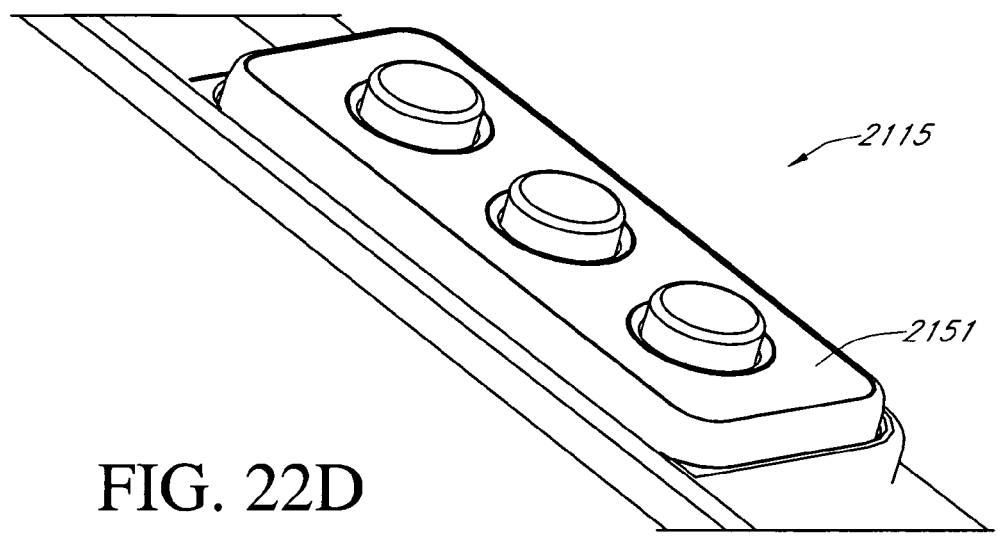
FIG. 22D is a perspective view of button controls.
Figure 22E:
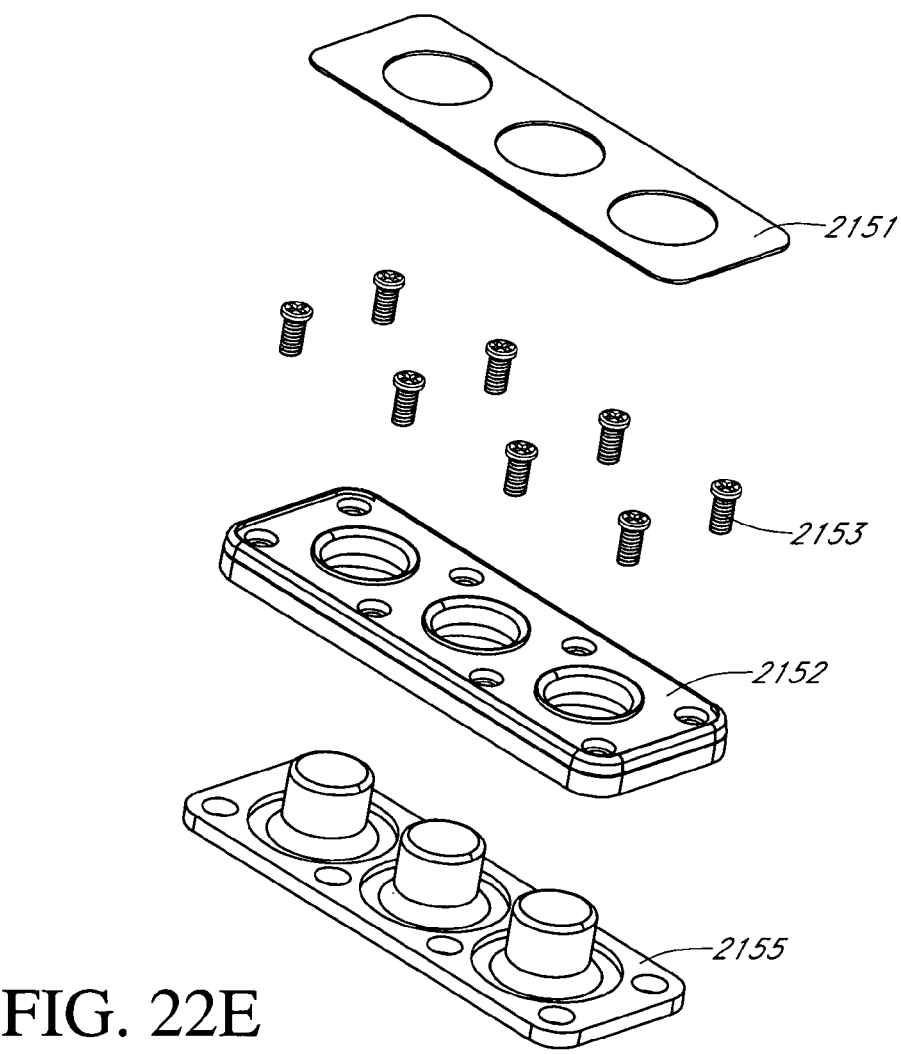
FIG. 22E is an exploded view of a button controls.

The button assembly 2115 is shown in FIGS. 22D and 22E. FIG. 22D depicts the assembled button assembly 2115 and FIG. 22E shows an exploded view. A decoration sheet 2151 covers a clamping piece 2152, which is held into the housing base 2102 using fasteners 2153. One skilled the art would recognize many different methods of fastening a control feature into the housing, such as, but not limited to, screw, bolts, snap fit components, adhesives, press fits, co-molded components, overmolded components, ultrasonically welded components, rotational fits, wedge fits, and other manufacturing means of effecting the assembly of components. A unitary button pad 2155 is held against the housing base 2102 by clamping piece 2152. The button pad 2155 may be constructed of a waterproof flexible material such as silicone rubber. Thus, the button pad 2155 may also serve the function of creating a waterproof seal about the control opening in the base 2102. The material and design geometry chosen provides not only a waterproof seal, but also an elasticity that allows manipulations of the electronic audio device, and enough rigidity to return to a neutral position after each use.

In some embodiments, a protective housing is provided that contains features that allow control of electronic audio devices that have touch sensitive surfaces. As used herein, a "touch sensitive surface" includes any electronic device interface feature that includes a surface that responds to touch by a human finger. Touch sensitive surfaces can include capacitive sensitive surfaces that respond to the conductive properties of human touch as well as pressure sensitive surfaces that respond to applied pressure. One series of devices utilizing a touch sensitive surface are the iPod® line of portable audio players manufactured by Apple Computer, Inc, Cupertino, Calif. These devices contain a static circular wheel structure that features a capacitive sensitive surface that responds to the conductive properties of human touch, measuring the position of the finger on the touch pad. In order to control such a feature through a protective housing (e.g., a waterproof, water resistant, or shock resistant housing), a control mechanism can be provided that will transfer or contain an electric charge from the user's finger that replicates the position of the control on the device as if the user were directly touching the touch pad. Such a control mechanism can utilize conductive material to transfer charge from a human finger to the proximity of the touch sensitive surface.

Figure 23A:
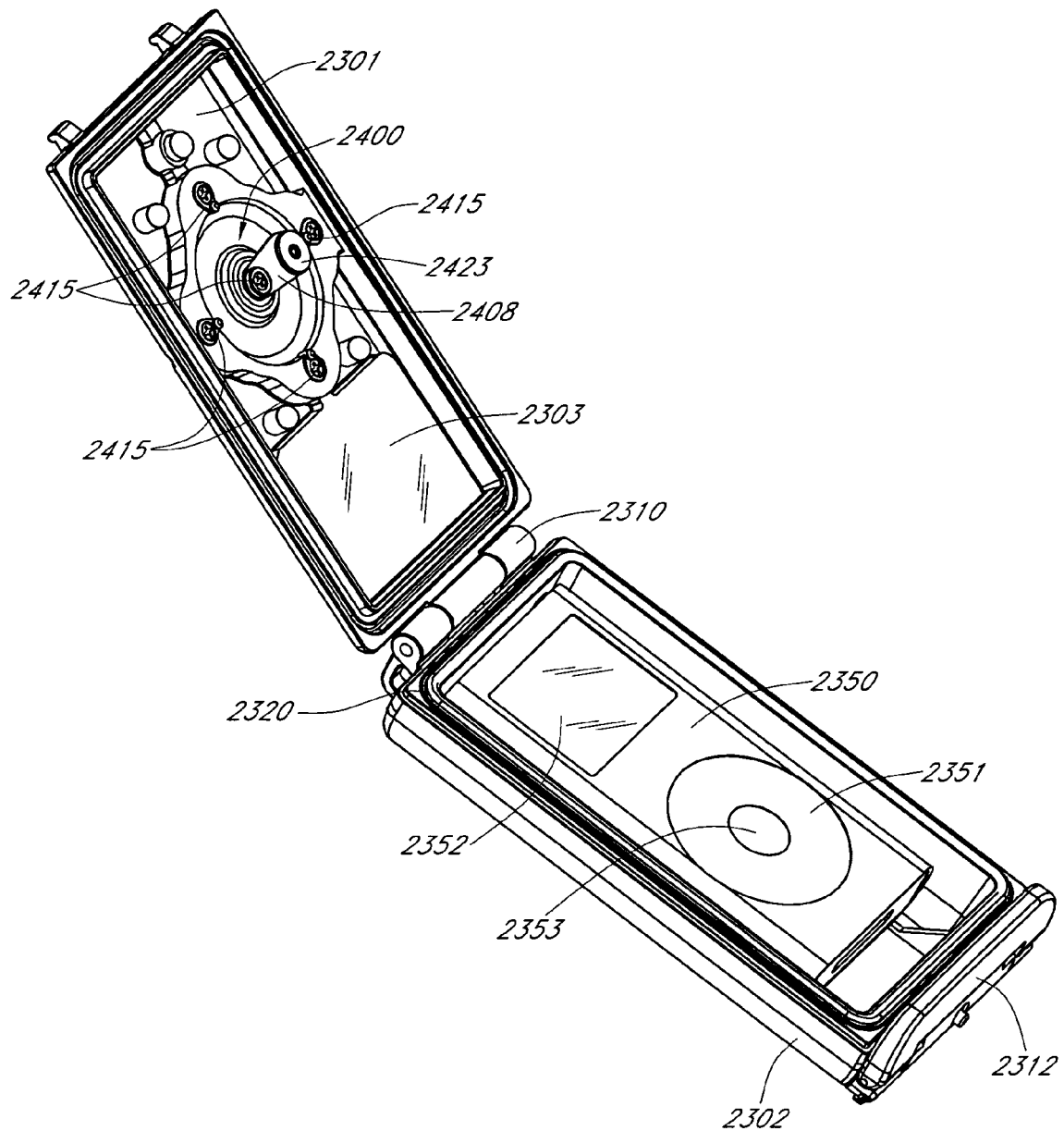
FIG. 23A is a perspective view of an open waterproof housing with a rotational control.
Figure 23B:
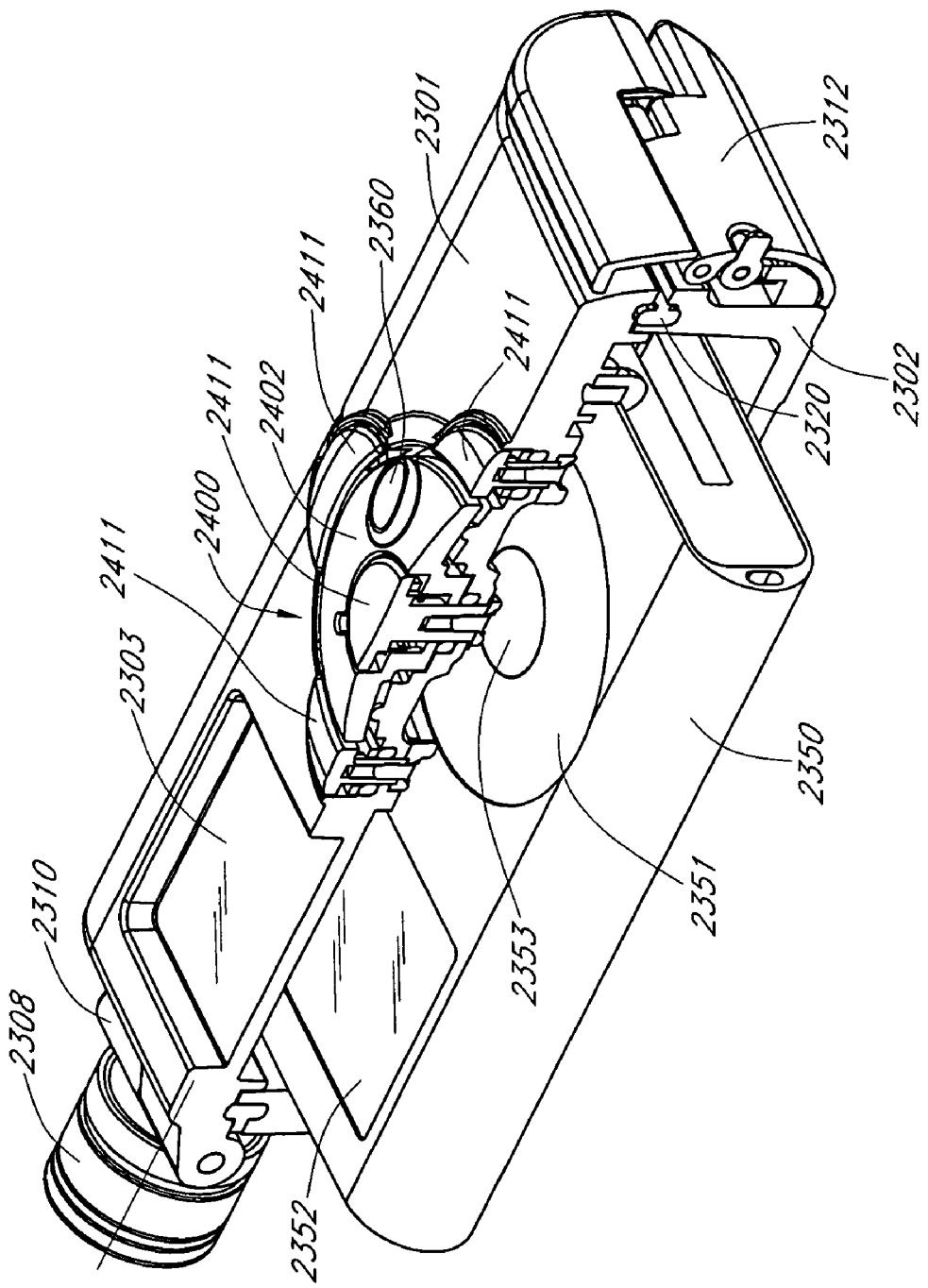
FIG. 23B a cross-sectional view of a closed waterproof housing with a rotational control.

FIGS. 23A and 23B show one embodiment of a housing utilizing a control mechanism for controlling a touch sensitive surface. FIG. 23A shows the system in perspective view with the lid open and FIG. 23B shows a cross-sectional view with the lid closed. An audio device 2350, with a touch sensitive control feature 2351, clicking push-button button 2353, and display screen 2352 is shown. The protective housing contains a lid 2301, base 2302, and for waterproof versions, a waterproof seal 2320 located between the two. The lid 2301 is connected to base 2302 via a hinge 2310. A latch mechanism 2312 may be provided to secure the lid 2301 to the base 2302 so as to form a waterproof seal there between. The display screen 2352 can be viewed through a display window 2303 in the lid. The touch sensitive control 2351 of the electronic audio device 2350 is controlled through the lid 2301 using a rotating control mechanism 2400. For capacitive touch sensitive controls, the rotating control mechanism 2400 may include conductive materials to transmit charge to the proximity of the control. For pressure sensitive controls, the rotating control mechanism 2400 need not include conductive materials.

On the inside of the lid 2301, the rotating control mechanism 2400 contains an arm 2408 coupled to a touch sensitive surface actuating member, such as touch wheel contact pad 2423 for contacting the touch control 2351. For capacitive controls, the arm 2408 and contact pad 2423 may be conductive. As the control mechanism 2400 is rotated, the arm 2408 rotates, moving the contact pad 2423 over the touch sensitive control 2351 on the electronic audio device 2350. In some embodiments, the shape and size of the pad 2423 may approximate the contact surface of a finger touching the control 2351. For example, the pad 2423 may be a metallic disk approximately 1 cm in diameter. In other embodiments, pad 2423 may be selective conductive plastics or a combination of materials that hold and transmit a charge, such as an electroplated plastic material. In embodiments where the touch control 2351 is pressure sensitive, non-conductive materials such as non-conductive plastics may be used for pad 2423.

In some embodiments where the electronic device contains a capacitive control feature, the touch sensitive surface actuating member such as pad 2423 may be positioned close to the touch sensitive control 2351, but not in physical contact with the touch sensitive control 2351. The charge provided by the touch sensitive surface actuating member (e.g., pad 2423) may be developed so that a predetermined proximity, such as 0.1 mm, 0.5 mm, 1 mm, or more will allow the touch sensitive control 2351 to react to the motion of the touch sensitive surface actuating member. In some embodiments, this distance may be variable, and controlled by the user from outside the housing lid 2301 or the housing base 2302. In some embodiments, a thin non-conductive material, such as an adhesive tape, may be placed over the touch sensitive surface actuating member (e.g., pad 2423) so as to electrically insulate the touch sensitive surface actuating member from the touch sensitive control 2351. A change in charge on the touch sensitive surface actuating member can then be detected by the touch sensitive control 2351 by detecting the change in capacitance between the control feature 2351 and the touch sensitive surface actuating member, provided the non-conductive material in between is not too thick. Other methods for adjusting the charge of the touch sensitive surface actuating member include selecting materials in the conductive wheel assembly 2402 that hold the desired charge amount to activate the control 2351 and utilizing batteries or other portable power sources in the assembly.

On the outside of the lid, the control mechanism 2400 contains a rotatable wheel 2402 configured such that the user can rotate the wheel 2402 with a finger. For capacitive controls, the rotatable wheel 2402 may include conductive material that is electrically connected to the arm 2408. Electric charge can then be conducted from the user's finger, through the conductive rotatable wheel 2402, through the control mechanism 2400, and into the touch sensitive surface actuating member (e.g., pad 2423). Accordingly, the change in the charge caused by contact of the user's finger can be sensed by the touch sensitive control 2351. In some embodiments, the rotatable conductive wheel 2402 comprises a feature such as an indentation 2360 for interfacing with a user's finger to facilitate the user rotating the wheel 2402. In some embodiments, a non-conductive mask is provided that covers all portions of the wheel 2402 except the indentation 2360 to minimize the chance of false sensing by the touch sensitive control feature 2351 on the electronic audio device 2350.

In embodiments where the touch sensitive control feature 2351 is pressure sensitive, the touch sensitive surface actuating member (e.g., pad 2423) may provide the required amount of pressure against the control feature 2351 such that as the rotatable wheel 2402 is rotated, movement of the touch sensitive surface actuating member over the control feature 2351 simulates the pressure of a human finger moving over the control feature 2351. In some embodiments, the touch sensitive surface actuating member may only transmit pressure to the control feature 2351 when downward pressure is applied by a user to the rotatable wheel 2402.

In some embodiments, the audio device 2350 may feature a touch wheel 2351 that additionally allows for activation by pressing pushbuttons at various locations about the wheel 2351. The pushbuttons may be activated through the housing using pushbutton assemblies. Additionally, a central button control mechanism may be provided for controlling a button 2353 in the middle of the wheel 2351 on the electronic audio device 2350. The central button 2353 on the electronic audio device 2350 may either be a capacitive touch sensitive button or a push button. On the inside of the lid, the push button assemblies comprise button contact pads 2415 for pressing the buttons on the electronic audio device 2350. On the outside of the lid, the push button assemblies contain finger pads 2411 for a user's finger to press the assemblies. In one embodiment, the pads are constructed of non-conductive plastic. When the central button 2353 on the electronic audio device 2350 is a capacitive touch sensitive button, the central button control mechanism 2350 may contain conductive elements for transferring charge from the user's finger. The mechanism 2350 may be configured such that electrical contact between the finger pad and the button contact pad is only made when the finger pad is pressed by the user.

The housing may also features an audio communication link such as described above with respect to FIGS. 22A, 22B, and 22C including a fastener 2308 to provide a waterproof connection with earphones or speakers. In some configurations, a wireless transmitter may be used for transmitting the signal to earphones or speakers.

Figure 24:
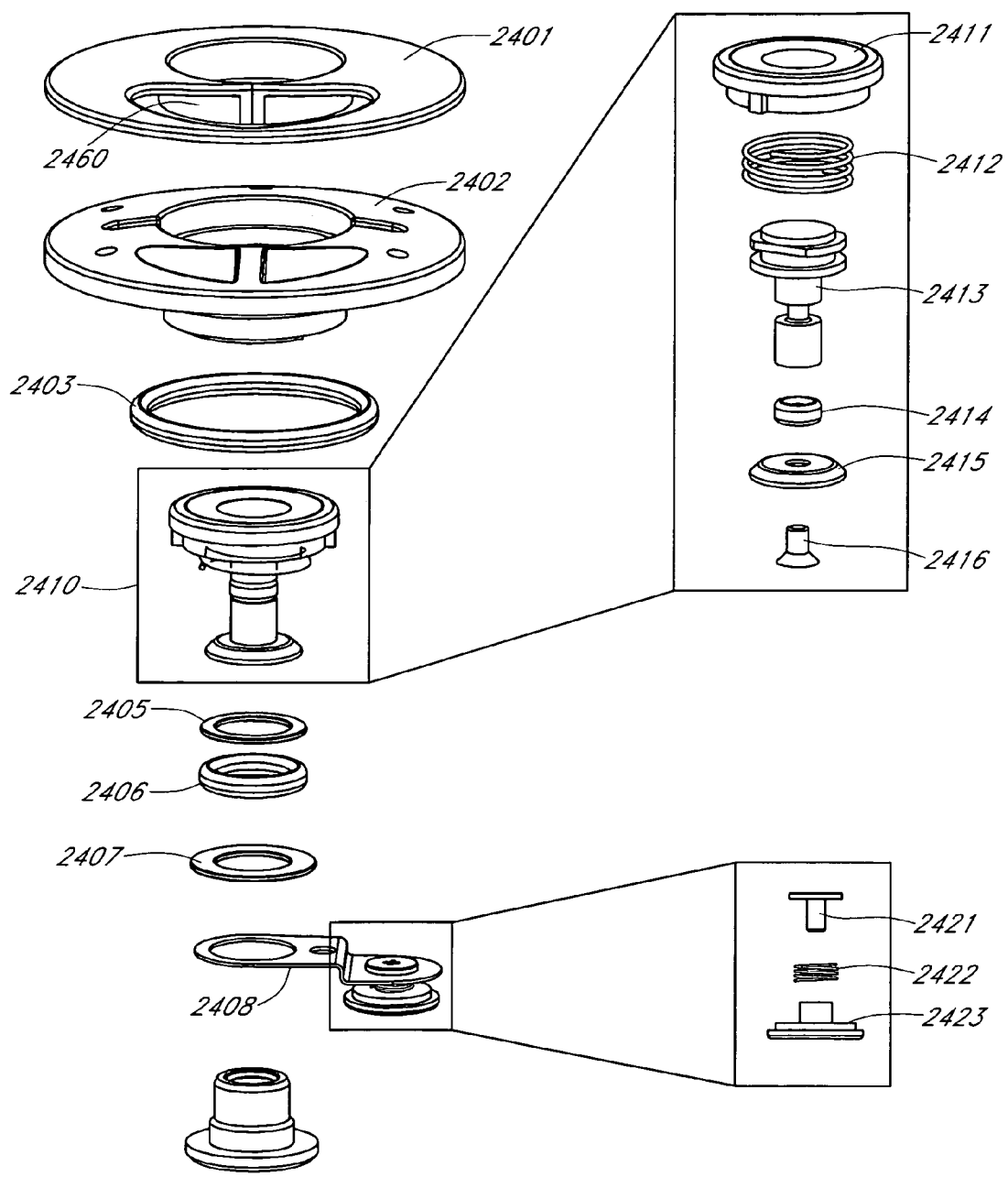
FIG. 24 is an exploded view of a rotational control with vertical control elements.

One embodiment of the rotatable control mechanism 2400 is shown in exploded view in FIG. 24. In one embodiment, the rotatable control mechanism 2400 consists of a non-conductive mask 2401 affixed about a conductive wheel 2402. The mask 2401 contains one or more apertures 2460 for allowing a user's finger to contact the wheel 2402. The mask 2401 prevents the dielectric charge of water particles from inadvertently activating the controls of the audio device 2350 by transferring a charge to the capacitive sensitive surface 2351 of the electronic audio device. Furthermore, the mask 2401 reduces accidental contact of the conductive wheel 2402 when the central button assembly 2410 is pressed. In other embodiments, no mask 2401 is provided. The wheel 2402 is seated atop an o-ring seal 2403 to prevent fluids from passing into the opening of the housing. The center of the rotatable control mechanism 2400 features a pushbutton assembly 2410 that consists of a button finger pad 2411, a pushbutton spring 2412, a shaft 2413 for transferring vertical force through the housing to button contact pad 2415, which is held to shaft 2413 using fastener 2416. There is also a shaft seal 2414 to prevent water flowing in the cavity of the housing through the hole in lid 2301 for the button assembly 2410. Wheel 2402 is connected through housing lid 2301 to a wheel arm 2408 using a clamping device that protects lid 2301 from water ingress using o-ring 2406 held in place by washers 2405 and 2407. Wheel arm 2408 connects to an assembly that features a fastener 2421, a spring 2422, and a touch pad 2423. The spring 2422 presses the touch pad 2423 against the touch sensitive control feature 2351 on the electronic audio device 2350. In some embodiments, a thin non-conductive material is coated on the bottom of the touch pad 2423. While these components effectively comprise a conductive scroll wheel assembly, one skilled in the art can find an alternate assembly of parts to generate the same effect. This rotatable assembly can be made entirely of electrically conductive parts, such as, but not limited to, metals, conductive plastics, metal coated plastics, co-molded assemblies, ceramics, and other conductive materials convenient for the manufacture of components. In alternative embodiments, devices that hold charge, such as a capacitor or battery, may be used in conjunction with the assembly to generate a positive or negative charge on the assembly in order to enhance the change in capacitance sensed by the touch wheel.

Although circular control features have been described, it will be appreciated that other shapes are also possible. For example, in some embodiments, a control mechanism is provided that allows a user to move a touch sensitive surface actuating member (e.g., pad 2423) in unrestricted directions over a touch sensitive control surface.

Although an electronic audio device has been described having a separate touch sensitive control feature 2351 and display screen 2352, it will be appreciated that other configurations are possible. For example, in some embodiments, the display screen 2352 itself is touch sensitive. In such embodiments, control mechanisms may be provided to position and maneuver a control pad (e.g., pad 2351) over the display screen 2352. In some of these embodiments, the control pad and other control features may be constructed of a transparent material so as to permit unobstructed viewing of the display screen. In some embodiments, the touch sensitive surface actuating member is positioned such that it does not directly contact the screen, for example, as described above, so as to prevent scratching of the screen.

The control mechanisms described above for use with touch sensitive controls may be used in any protective housings for electronic audio devices. For example, the mechanisms may be incorporated into a waterproof housing. The rigid control mechanisms may prevent the device control features from activating as a result of underwater pressures. The mechanisms may also be incorporated into water resistant and/or shock or impact resistant housings. For example, rugged housings designed to withstand mechanical shock and stress may be provided that are not waterproof. The rigid control mechanisms described herein provide protection of the audio device in such environments. The protective housing may also be designed to protect against dust, dirt, heat, cold, or other harsh environments.

Other control features that can be manipulated using mechanisms described herein include but are not limited to buttons, levers, switches, capacitive touch screens, capacitive surfaces, slides, latches, joysticks, and button pads.

Figure 25:
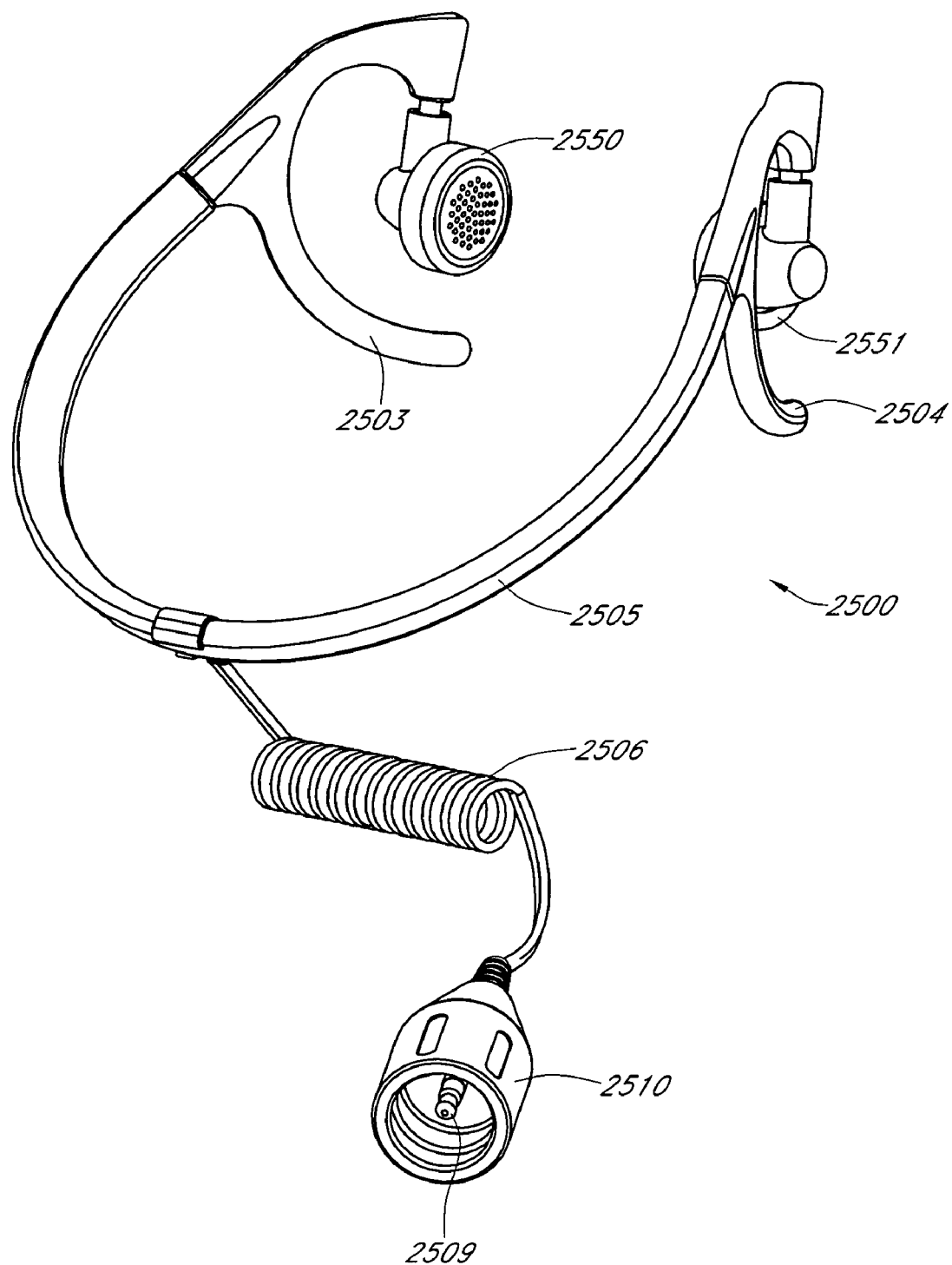
FIG. 25 is a perspective view of a waterproof speaker headset.

In one embodiment, a set of waterproof headphones are provided for use in conjunction with any of the housings described above. In particular, the headphones depicted in FIG. 25 may be configured to connect to the housings depicted in FIGS. 21A and B and 23A and B. Headphones 2500 features left channel waterproof speaker assembly 2550 and right channel waterproof speaker assembly 2551, which transmit audio signals into the left and/or right ear canals of the user. The left speaker assembly 2550 is held in place on the left ear using an ear clip frame 2503, while the right speaker assembly 2551 is held on using right ear clip frame 2504. These ear clip frames provide added stability for the user to maintain correct positioning of the speakers in the ears during active water sports. Additionally a tension providing neck frame 2505 secures the ear clips 2503 and 2504 by connecting them around the head of the user. As shown, neck frame 2505 wraps around the base of the skull of a user which is optimal for securing the headset on the user during water sports, particularly when water flows over the head of the user. Neck frame 2505 also provides a mechanism for speaker wire 2506 to connect to waterproof speaker assemblies 2550 and 2551. The speaker wire 2506 is split into the left channel and right channel signals at the base of the neck frame 2505. Speaker wire 2506 features a strain relief area that leads to a male electrical connector 2509, such as a 3.5 mm stereo plug, found commonly on portable audio devices. One method of providing a waterproof environment for the electrical connection between the audio device and the waterproof speaker connector 2509, is to use a flexible over mold assembly 2510 that attaches to fastener 2308 or 2108 as part of the audio communication link of the housings described above. The method of attachment to the audio communication fasteners shown has the flexible over mold 2510 securing to the outside of the fastener of the audio communication link of the housing. Those will skill in the art will recognize that this design may alternatively provide a waterproof connection using internal features of a fastener.

While the speaker headset described above uses electrically conductive wires for the transmission of audio output, there may be configurations where the audio communication link is wireless. Such wireless systems are described in more detail in U.S. application Ser. No. 11/123,878, filed on May 6, 2005, which is incorporated herein by reference in its entirety and specifically for the purpose of describing systems and methods for providing audio to the ears of a user in an aquatic environment using wireless transmission of signals to headphones.

Embodiments of the present invention have been shown and described with a degree of particularity to enable their complete and full understanding. It should be understood, however, that the present invention embodies the inventive concepts as defined by the claims, and is not limited by any detailed description herein.

What is claimed is:

1. A protective housing configured to receive an electronic audio device, comprising:
   a substantially rigid movable control positioned on the exterior of the housing; and
   a touch sensitive surface actuating member positioned in the interior of the housing and coupled to the movable control in such a way that movement of the movable control moves the touch sensitive surface actuating member in at least a lateral direction over a touch sensitive surface on the electronic audio device.

2. The housing of claim 1, wherein the movable control comprises a rotatable wheel.

3. The housing of claim 2, wherein the rotatable wheel and touch sensitive surface actuating member are configured such that rotating the rotatable wheel causes the touch sensitive surface actuating member to move in a circular path.

4. The housing of claim 3, wherein the touch sensitive surface actuating member is coupled to the rotatable wheel by an arm coupled to the rotatable wheel at the wheel's axis.

5. The housing of claim 4, wherein the touch sensitive surface actuating member, wheel, and arm comprise conductive material.

6. The housing of claim 1, wherein the touch sensitive surface actuating member is configured to make physical contact with the touch sensitive surface.

7. The housing of claim 1, wherein the touch sensitive surface actuating member is configured to not make physical contact with the touch sensitive surface.

8. The housing of claim 1, wherein the touch sensitive surface actuating member is configured to be selectively positioned to make physical contact with the touch sensitive surface or not make contact with the touch sensitive surface.

9. The housing of claim 1, wherein the protective housing is waterproof.

10. The housing of claim 1, wherein the protective housing is water resistant.

11. The housing of claim 1, wherein the protective housing is shock resistant.

12. A protective housing adapted to receive an electronic audio device, comprising a conductive control feature disposed on the exterior of the housing and adapted to conduct charge from the exterior of the housing into proximity of a capacitive sensitive surface on the electronic audio device.

13. The housing of claim 12, wherein the conductive control feature comprises a rotatable wheel.

14. The housing of claim 12, comprising a power source configured to variably control the charge that is in close proximity of the capacitive sensitive surface.

15. The housing of claim 14, wherein the power source is a battery.

16. The housing of claim 14, wherein the power source comprises a junction between dissimilar materials.

17. The housing of claim 14, wherein the power source is configured to be selectively activated or deactivated by a user.

18. The housing of claim 12, wherein the protective housing is waterproof.

19. The housing of claim 12, wherein the protective housing is water resistant.

20. The housing of claim 12, wherein the protective housing is shock resistant.

21. A protective housing adapted to receive an electronic audio device, comprising:
   means for making electrical contact with a human finger on the exterior of the electronic audio device; and
   means for conveying an electrical signal from the human finger into proximity of a capacitive sensitive surface on the electronic audio device.

22. An audio system, comprising:
   an electronic audio device comprising a touch sensitive surface;
   a protective housing configured to receive the audio device;
   a substantially rigid movable control positioned on the exterior of the housing; and
   a touch sensitive surface actuating member positioned in close proximity to the touch sensitive surface, wherein the touch sensitive surface actuating member is coupled to the movable control in such a way that movement of the movable control moves the touch sensitive surface actuating member in at least a lateral direction over the touch sensitive surface.

23. The system of claim 22, wherein the touch sensitive surface is a capacitive sensitive surface.

24. The system of claim 23, wherein the movable control and touch sensitive surface actuating member comprise conductive material.

25. The system of claim 23, wherein the touch sensitive surface actuating member is not in direct physical contact with the touch sensitive surface.

26. The system of claim 22, wherein the touch sensitive surface actuating member is in direct physical contact with the touch sensitive surface.

27. The system of claim 22, wherein the touch sensitive surface is a pressure sensitive surface.

28. The system of claim 22, wherein the electronic audio device comprises a display screen.

29. The system of claim 28, wherein the touch sensitive surface is integrated into the display screen.

30. The housing of claim 22, wherein the protective housing is waterproof.

31. The housing of claim 22, wherein the protective housing is water resistant.

32. The housing of claim 22, wherein the protective housing is shock resistant

33. A method of controlling an electronic audio device, the electronic audio device having a capacitive sensitive surface, the method comprising:
    placing the electronic audio device in a housing; and
    contacting an electrically conductive control feature on the exterior of the housing with a human finger such that an electrical signal from the human finger is conveyed into proximity of the electronic audio device.

34. The method of claim 33, wherein said contacting occurs underwater.

35. The method of claim 34, wherein said housing is waterproof.

36. The method of claim 33, further comprising the step of moving at least a portion of the electrically conductive control feature in at least a lateral direction over the capacitive sensitive surface of the electronic audio device.

37. The method of claim 1, wherein the touch sensitive surface actuating member is movable in a direction generally parallel to the touch sensitive surface.

* * * * *